United States Patent
Kusama et al.

(10) Patent No.: US 9,869,803 B2
(45) Date of Patent: Jan. 16, 2018

(54) COMPOSITION FOR LIGHT DIFFUSION FILM, AND LIGHT DIFFUSION FILM

(71) Applicant: LINTEC Corporation, Itabashi-Ku, Tokyo (JP)

(72) Inventors: Kentaro Kusama, Tokyo (JP); Baku Katagiri, Tokyo (JP); Tomoo Orui, Tokyo (JP)

(73) Assignee: LINTEC Corporation, Tokyo (JP)

( * ) Notice: Subject to any disclaimer, the term of this patent is extended or adjusted under 35 U.S.C. 154(b) by 93 days.

(21) Appl. No.: 14/773,920

(22) PCT Filed: Feb. 4, 2014

(86) PCT No.: PCT/JP2014/052481
§ 371 (c)(1),
(2) Date: Sep. 9, 2015

(87) PCT Pub. No.: WO2014/156303
PCT Pub. Date: Oct. 2, 2014

(65) Prior Publication Data
US 2016/0018571 A1 Jan. 21, 2016

(30) Foreign Application Priority Data
Mar. 28, 2013 (JP) .................. 2013-068725

(51) Int. Cl.
- G02B 5/02 (2006.01)
- C08J 7/04 (2006.01)
- C08F 283/00 (2006.01)
- C08F 290/14 (2006.01)
- G02B 1/04 (2006.01)

(52) U.S. Cl.
CPC ........ *G02B 5/0236* (2013.01); *C08F 283/006* (2013.01); *C08F 290/147* (2013.01); *C08J 7/047* (2013.01); *G02B 1/04* (2013.01); *G02B 5/0257* (2013.01); *C08J 2367/02* (2013.01); *C08J 2433/06* (2013.01); *C08J 2475/16* (2013.01); *G02B 2207/123* (2013.01)

(58) Field of Classification Search
CPC ...... G02B 5/0236; G02B 5/0257; G02B 1/04; G02B 2207/123; C08J 7/047; C08J 2367/02; C08J 2433/06; C08J 2475/16; C08F 283/006; C08F 290/147

USPC .......................................... 428/220
See application file for complete search history.

(56) References Cited

U.S. PATENT DOCUMENTS

| | | | | |
|---|---|---|---|---|
| 5,811,472 A * | 9/1998 | Patel | ........... | C09D 4/00 522/14 |
| 6,850,682 B2 * | 2/2005 | Takemura | ........... | C03C 25/1055 385/128 |
| 9,632,217 B2 * | 4/2017 | Kusama | ........... | C08F 283/006 |
| 2008/0304393 A1 * | 12/2008 | Shibuya | ........... | C08K 5/3435 369/112.01 |
| 2014/0340752 A1 * | 11/2014 | Kusama | ........... | G02B 5/021 359/599 |

FOREIGN PATENT DOCUMENTS

| JP | 2001-083308 A | 3/2001 | | |
|---|---|---|---|---|
| JP | 2006-045545 A | 2/2006 | | |
| JP | 2012-141591 A | 7/2012 | | |
| JP | 2012-141592 A | 7/2012 | | |
| JP | 2012141592 A * | 7/2012 | ........... | G02B 5/0257 |
| WO | 2005-066663 A | 7/2005 | | |

* cited by examiner

*Primary Examiner* — Michael M Bernshteyn
(74) *Attorney, Agent, or Firm* — Renner, Kenner; Arthur M. Reginelli

(57) ABSTRACT

Provided are a composition for light diffusion film which has satisfactory incident angle dependency in transmission and diffusion of light, does not easily undergo yellowing even if exposed to ultraviolet radiation for a long time, and has excellent weather resistance, and a light diffusion film formed by curing the composition. Disclosed is a composition for light diffusion film, which includes a (meth)acrylic acid ester containing plural aromatic rings as component (A), a urethane (meth)acrylate as component (B), a photopolymerization initiator as component (C), and a hindered amine-based photostabilizer as component (D), and in which the content of the component (A) has a value within a predetermined range relative to 100 parts by weight of the component (B), the content of the component (C) has a value within a predetermined range relative to the total amount (100 parts by weight) of the component (A) and the component (B), and the content of the component (D) has a value within a predetermined range relative to the total amount (100 parts by weight) of the component (A) and the component (B).

9 Claims, 22 Drawing Sheets

CONTENT OF HINDERED AMINE-BASED PHOTOSTABILIZER (PARTS BY WEIGHT)

Fig.12(a)
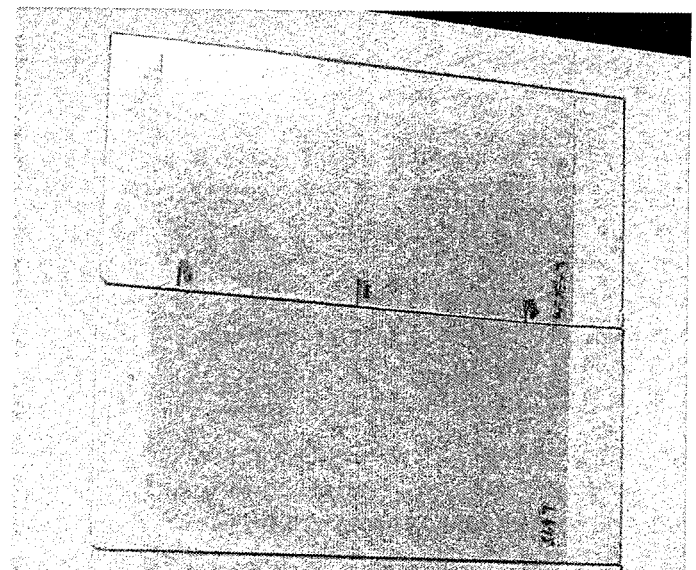
Fig.12(b)
Fig.12(c)
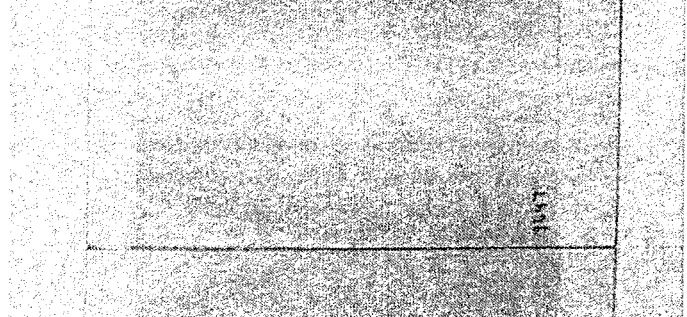
Fig.12(d)
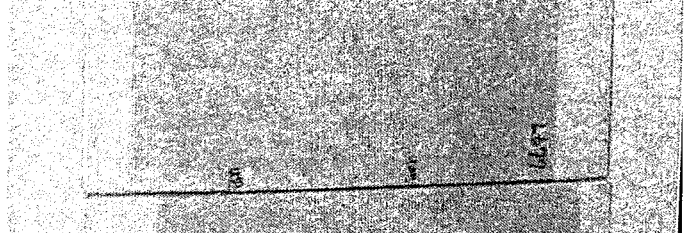
Fig.12(e)
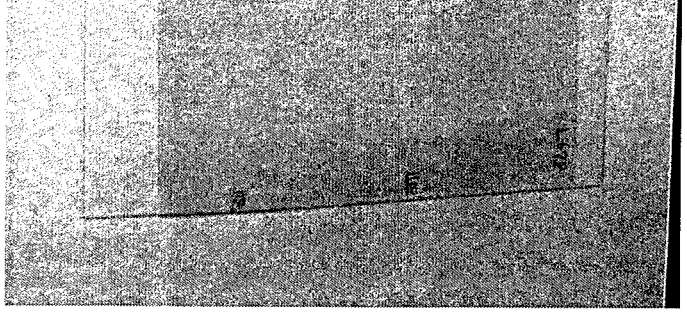

COMPARATIVE EXAMPLE 1    EXAMPLE 4

BEGINNING　　　　AFTER ACCELERATED
　　　　　　　　　WEATHER RESISTANCE TEST

COMPARATIVE EXAMPLE 1            EXAMPLE 9

BEGINNING    AFTER ACCELERATED
             WEATHER RESISTANCE TEST

BEGINNING　　　　　AFTER ACCELERATED
　　　　　　　　　　WEATHER RESISTANCE TEST

COMPOSITION FOR LIGHT DIFFUSION FILM, AND LIGHT DIFFUSION FILM

TECHNICAL FIELD

The present invention relates to a composition for light diffusion film, and to a light diffusion film.

More particularly, the present invention relates to a composition for light diffusion film capable of providing a light diffusion film which has satisfactory incidence angle dependency in transmission and diffusion of light, does not easily undergo yellowing even if exposed to ultraviolet radiation for a long time, and has excellent weather resistance, and to a light diffusion film obtained by photocuring the composition for light diffusion film.

BACKGROUND ART

Conventionally, for example, in the field of optical technology to which liquid crystal display devices and the like belong, it has been suggested to use a light diffusion film which can diffuse an incident light coming from a particular direction into particular directions, while directly transmitting an incident light coming from other directions.

A variety of forms of such a light diffusion film are known; however, in particular, a light diffusion film having, within the film, a louver structure in which plural plate-shaped regions having different refractive indices are alternately arranged in one arbitrary direction along the film plane, has been widely used.

Furthermore, regarding another type of light diffusion film, a light diffusion film having, within the film, a columnar structure in which plural pillar-shaped objects having a relatively high refractive index are arranged to stand close together in regions having a relatively low refractive index, has been widely used.

Meanwhile, it is known that such a light diffusion film having a louver structure or a columnar structure is obtained by irradiating a coating layer that is formed by applying a composition for light diffusion film containing two or more kinds of polymerizable compounds having different refractive indices into a film form, with active energy radiation by a predetermined method.

That is, a light diffusion film having a predetermined internal structure can be obtained by curing the coating layer while subjecting the two or more kinds of polymerizable compounds in the coating layer to phase separation, by irradiating the coating layer with predetermined active energy radiation having a controlled direction of propagation.

Therefore, in order to obtain a high-quality light diffusion film having a more well-defined internal structure and having satisfactory incident angle dependency in transmission and diffusion of light, there has been suggested a composition for light diffusion film, which can achieve phase separation of two or more kinds of polymerizable compounds more efficiently, and can photocure the polymerizable compounds more stably (for example, Patent Documents 1 and 2).

That is, Patent Document 1 discloses a composition for an anisotropic light diffusion film, the composition including a biphenyl compound represented by the following Formula (10) as component (A), and a polymerizable compound having a weight average molecular weight value within the range of 3,000 to 20,000 as component (B), characterized in that the content of the component (A) is adjusted to a value within the range of 25 parts to 400 parts by weight relative to 100 parts by weight of the component (B).

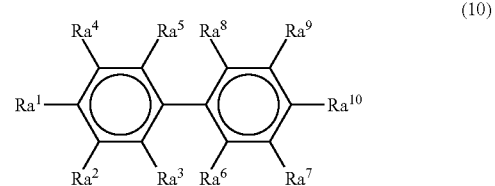

wherein in Formula (10), $Ra^1$ to $Ra^{10}$ are respectively independent of one another; at least one of $Ra^1$ to $Ra^{10}$ represents a substituent represented by the following Formula (11), while the others each represent any one substituent selected from a hydrogen atom, a hydroxyl group, a carboxyl group, an alkyl group, an alkoxy group, a halogenated alkyl group, a hydroxyalkyl group, a carboxyalkyl group, and a halogen atom.

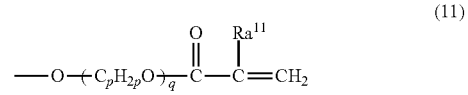

wherein in Formula (11), $Ra^{11}$ represents a hydrogen atom or a methyl group; the number of carbon atoms p represents an integer from 1 to 4; and the number of repetition q represents an integer from 1 to 10.

Furthermore, Patent Document 2 discloses a composition for an anisotropic light diffusion film, which includes a (meth)acrylic acid ester containing plural aromatic rings as component (A); and a urethane (meth)acrylate having a weight average molecular weight value within the range of 3,000 to 20,000 as component (B), characterized in that the urethane (meth)acrylate as the component (B) is a compound derived from the following components (a) to (c) as constituent components and is composed of the components at a molar ratio of component (a):component (b):component (c)=1 to 5:1:1 to 5, and the content of the component (A) is adjusted to a value within the range of 25 parts to 400 parts by weight relative to 100 parts by weight of the component (B):

(a) a compound containing two isocyanate groups via an aliphatic ring;
(b) a polyalkylene glycol; and
(c) a hydroxyalkyl (meth)acrylate.

CITATION LIST

Patent Document

Patent Document 1: JP 2012-141591 A (Claims)
Patent Document 2: JP 2012-141592 A (Claims)

DISCLOSURE OF THE INVENTION

Problem to be Solved by the Invention

However, the light diffusion films obtained by photocuring the compositions for anisotropic light diffusion films described in Patent Documents 1 and 2 are susceptible to yellowing when exposed to ultraviolet radiation for a long time, and have a problem in connection with weather resistance.

From this point of view, since application of light diffusion films to articles that may be used outdoors, such as a reflective type liquid crystal display device or a projection screen, such a problem of weather resistance is serious and needs to be addressed.

Thus, in order to solve such a problem of weather resistance, a method of adding an ultraviolet absorber in advance to a composition for light diffusion film may be considered; however, in that case, when the composition for light diffusion film is irradiated with active energy radiation, this ultraviolet absorber absorbs ultraviolet radiation.

As a result, it is difficult to form a well-defined internal structure within the film, and there has been a problem that it is difficult to cure the film.

Thus, under such circumstances as described above, the inventors of the present invention conducted a thorough investigation, and the inventors found that when a (meth) acrylic acid ester having a particular structure, a urethane (meth)acrylate, a photopolymerization initiator, and a hindered amine-based photostabilizer are mixed at predetermined proportions, and then the mixture is photocured, a light diffusion film having satisfactory incident angle dependency and also having excellent weather resistance is obtained. Thus, the inventors completed the present invention.

That is, an object of the present invention is to provide a composition for light diffusion film capable of producing a light diffusion film which has satisfactory incident angle dependency in transmission and diffusion of light, does not easily undergo yellowing even if exposed to ultraviolet radiation for a long time, and has excellent weather resistance, and to provide a light diffusion film obtained by photocuring the composition for light diffusion film.

Incidentally, "satisfactory incident angle dependency" means that the distinction between a light diffusion incident angle region in which incident light is diffusion by the film, and a non-light diffusion incident angle region in which incident light is not diffused but is directly transmitted through the film, is definitely controlled.

Means for Solving Problem

According to an aspect of the present invention, there is provided a composition for light diffusion film, including a (meth)acrylic acid ester containing plural aromatic rings as component (A); a urethane (meth)acrylate as component (B); a photopolymerization initiator as component (C); and a hindered amine-based photostabilizer as component (D), characterized in that the content of the component (A) is adjusted to a value within the range of 25 parts to 400 parts by weight relative to 100 parts by weight of the component (B), and the content of the component (C) is adjusted to a value within the range of 0.2 parts to 20 parts by weight relative to the total amount, taken as 100 parts by weight, of the component (A) and the component (B), while the content of the component (D) is adjusted to a value within the range of 0.1 parts to 10 parts by weight relative to the total amount, taken as 100 parts by weight, of the component (A) and the component (B). Thus, the problems described above can be solved.

That is, with the composition for light diffusion film of the present invention, since a (meth)acrylic acid ester having a particular structure as the component (A) is incorporated, and also, a urethane (meth)acrylate as the component (B) is incorporated, a predetermined difference is generated between the respective rates of polymerization (for example, rate of photoradical polymerization) of the components, and thus the two components can be prevented from being uniformly copolymerized.

This is speculated to be because compatibility between the component (A) and the component (B) is decreased to a predetermined extent, and thereby copolymerizability between the two components can be decreased.

Therefore, when the composition is irradiated with active energy radiation, the composition can be photocured while the component (A) and the component (B) are caused to undergo phase separation efficiently, and thereby, a predetermined internal structure such as a louver structure or a columnar structure can be formed in a well-defined manner within the film.

On the other hand, with the composition for light diffusion film of the present invention, since a hindered amine-based photostabilizer is incorporated as a component (D), when the composition is photocured, excellent weather resistance can be imparted to a light diffusion film obtainable from the composition, without inhibiting the formation of a predetermined internal structure.

Therefore, with the composition for light diffusion film of the present invention, a light diffusion film which has satisfactory incident angle dependency in transmission and diffusion of light, does not easily undergo yellowing even if exposed to ultraviolet radiation for a long time, and has excellent weather resistance, can be obtained.

Furthermore, on the occasion configuring the composition for light diffusion film of the present invention, it is preferable that the component (D) is a hindered amine-based photostabilizer represented by the following Formula (1):

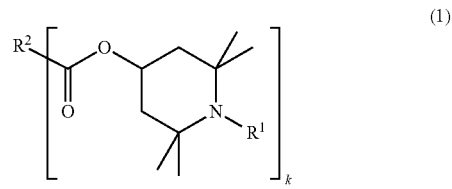

wherein in Formula (1), $R^1$ represents a hydrogen atom, an alkyl group having 1 to 10 carbon atoms, or an alkoxy group having 1 to 10 carbon atoms; $R^2$ represents a hydrogen atom, a k-valent aliphatic hydrocarbon group having 1 to 10 carbon atoms, a k-valent alicyclic hydrocarbon group having 3 to 20 carbon atoms, a k-valent aromatic hydrocarbon group having 6 to 20 carbon atoms, a k-valent aryl group having 7 to 30 carbon atoms, a k-valent heterocyclic aromatic hydrocarbon group having 3 to 20 carbon atoms, or a monovalent fatty acid in which the number of carbon atoms of the carbon chain moiety having an ester moiety formed with an alcohol having 1 to 10 carbon atoms at the end on the opposite side of the piperidine skeleton is 1 to 20; and k represents an integer from 1 to 3.

When such a configuration is adopted, a light diffusion film having superior weather resistance can be obtained.

Furthermore, on the occasion of configuring the composition for light diffusion film of the present invention, it is preferable that the component (C) is an α-hydroxyacetophenone-type photopolymerization initiator.

When such a configuration is adopted, a light diffusion film having more satisfactory incident angle dependency in transmission and diffusion of light can be obtained.

Furthermore, on the occasion of configuring the composition for light diffusion film of the present invention, it is preferable that the component (A) is a biphenyl compound represented by the following Formula (2):

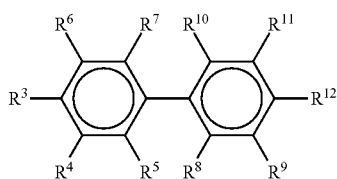

wherein in Formula (2), $R^3$ to $R^{12}$ are respectively independent of one another; at least one of $R^3$ to $R^{12}$ represents a substituent represented by the following Formula (3); and the others each represent any one substituent selected from a hydrogen atom, a hydroxyl group, a carboxyl group, an alkyl group, an alkoxy group, a halogenated alkyl group, a hydroxyalkyl group, a carboxyalkyl group, and a halogen atom;

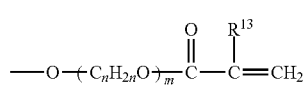

wherein in Formula (3), $R^{13}$ represents a hydrogen atom or a methyl group; the number of carbon atoms n represents an integer from 1 to 4; and the number of repetitions m represents an integer from 1 to 10.

When such a configuration is adopted, a light diffusion film which has satisfactory incident angle dependency in transmission and diffusion of light while maintaining excellent weather resistance, can be obtained.

Furthermore, on the occasion of configuring the composition for light diffusion film of the present invention, it is preferable that, in Formula (2), any one of $R^4$ to $R^{11}$ represents a substituent represented by Formula (3).

When such a configuration is adopted, a light diffusion film which has more satisfactory incident angle dependency in transmission and diffusion of light while maintaining excellent weather resistance, can be obtained.

Furthermore, on the occasion of configuring the composition for light diffusion film of the present invention, it is preferable that the component (B) is a urethane (meth)acrylate which has a weight average molecular weight value within the range of 3,000 to 20,000, has constituent components derived from the following components (B1) to (B3), and is composed at a molar ratio of component (B1):component (B2):component (B3)=1 to 5:1:1 to 5:

(B1) a compound containing two isocyanate groups via an aliphatic ring;
(B2) a polyalkylene glycol; and
(B3) a hydroxyalkyl (meth)acrylate.

When such a configuration is adopted, a light diffusion film which has more satisfactory incident angle dependency in transmission and diffusion of light while maintaining excellent weather resistance, can be obtained.

Furthermore, according to another aspect of the present invention, there is provided a light diffusion film obtained by irradiating a composition for light diffusion film with active energy radiation, the composition for light diffusion film including a (meth)acrylic acid ester containing plural aromatic rings as component (A); a urethane (meth)acrylate as component (B); a photopolymerization initiator as component (C); and a hindered amine-based photostabilizer as component (D), characterized in that the content of the component (A) is adjusted to a value within the range of 25 parts to 400 parts by weight relative to 100 parts by weight of the component (B), and the content of the component (C) is adjusted to a value within the range of 0.2 parts to 20 parts by weight relative to the total amount, taken as 100 parts by weight, of the component (A) and the component (B), while the content of the component (D) is adjusted to a value within the range of 0.1 parts to 10 parts by weight relative to the total amount, taken as 100 parts by weight, of the component (A) and the component (B).

That is, with the light diffusion film of the present invention, since the light diffusion film is produced by photocuring a predetermined composition for light diffusion film, a light diffusion film which has satisfactory incident angle dependency in transmission and diffusion of light, does not easily undergo yellowing even if exposed to ultraviolet radiation for a long time, and has excellent weather resistance, can be obtained.

Furthermore, on the occasion of the configuring the light diffusion film of the present invention, it is preferable that the film thickness has a value within the range of 60 to 700 μm.

When such a configuration is adopted, a light diffusion film which has more satisfactory incident angle dependency in transmission and diffusion of light while maintaining excellent weather resistance, can be obtained.

Furthermore, on the occasion of configuring the light diffusion film of the present invention, it is preferable that the film thickness has a value of 170 μm or more, and the Δb* value, which is the difference between the values of b* obtained before and after an accelerated weather resistance test of radiating light having a center wavelength of 388 nm under the conditions of 100 hours at an illuminance of 50 mW/cm² using a fadeometer equipped with a carbon arc lamp, has a value of 12 or less.

When such a configuration is adopted, a light diffusion film having superior weather resistance can be obtained.

Meanwhile, the value of b* is a parameter of one of the three axes constituting the CIE 1976 (L*a*b*) color space, and is calculated from the tristimulus values xyz of CIEXYZ; however, the b* value can be directly measured using the fadeometer described above, under the conditions of radiation according to JIS B 7751.

BRIEF DESCRIPTION OF DRAWINGS

FIGS. 12(a) to 12(e) are photographs provided in order to show weather resistance of the light diffusion films of Examples 1 to 4 and Comparative Example 1.

MODE(S) FOR CARRYING OUT THE INVENTION

First Embodiment

A first embodiment of the present invention relates to a composition for light diffusion film, including a (meth) acrylic acid ester containing plural aromatic rings as component (A); a urethane (meth)acrylate as component (B); a photopolymerization initiator as component (C); and a hindered amine-based photostabilizer as component (D), characterized in that the content of the component (A) is adjusted to a value within the range of 25 parts to 400 parts by weight relative to 100 parts by weight of the component (B), and the content of the component (C) is adjusted to a value within the range of 0.2 parts to 20 parts by weight relative to the total amount, taken as 100 parts by weight, of the component (A) and the component (B), while the content of the component (D) is adjusted to a value within the range of 0.1 parts to 10 parts by weight relative to the total amount, taken as 100 parts by weight, of the component (A) and the component (B).

Hereinafter, the first embodiment of the present invention will be explain specifically with appropriate reference to the drawings; however, in order to facilitate the understanding of such explanations, first, the fundamental principles of light diffusion in a light diffusion film will be explained.

1. Fundamental Principles of Light Diffusion in Light Diffusion Film (1) Anisotropic Light Diffusion First of all, a light diffusion film having anisotropic light diffusion characteristics will be explained using FIGS. 1 and 2.

Figure 1A:
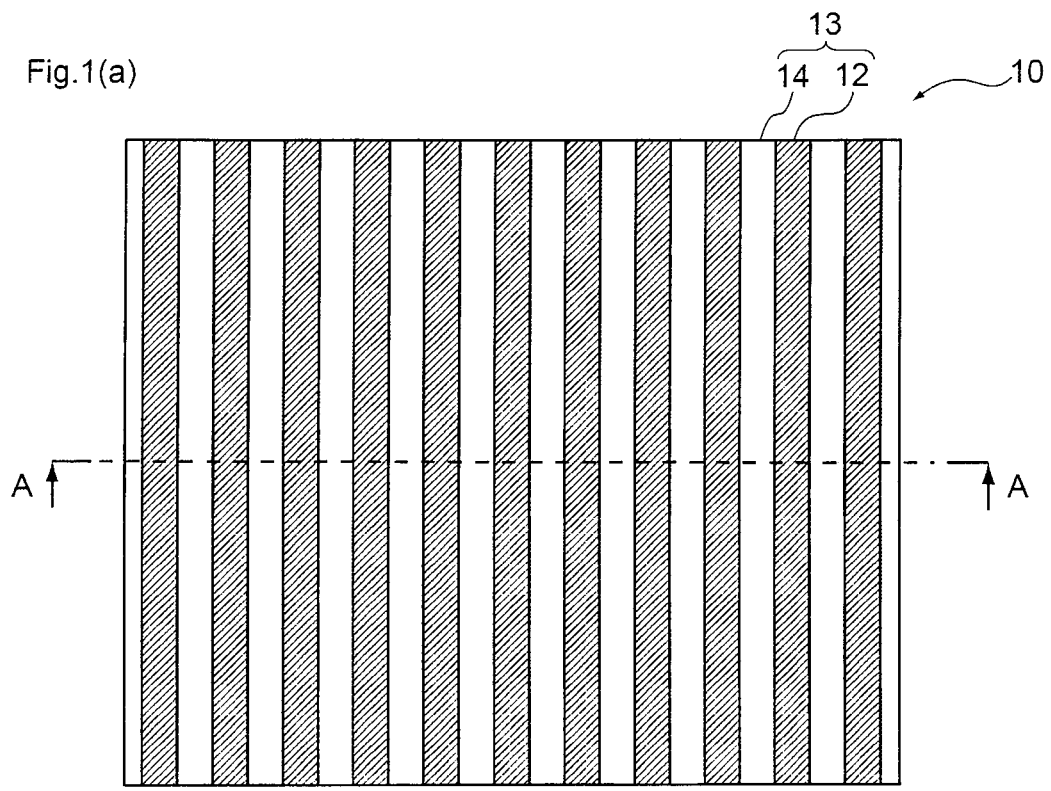
FIGS. 1(a) and 1(b) are diagrams provided in order to explain the outline of a light diffusion film which includes a louver structure inside the film.
Figure 1B:
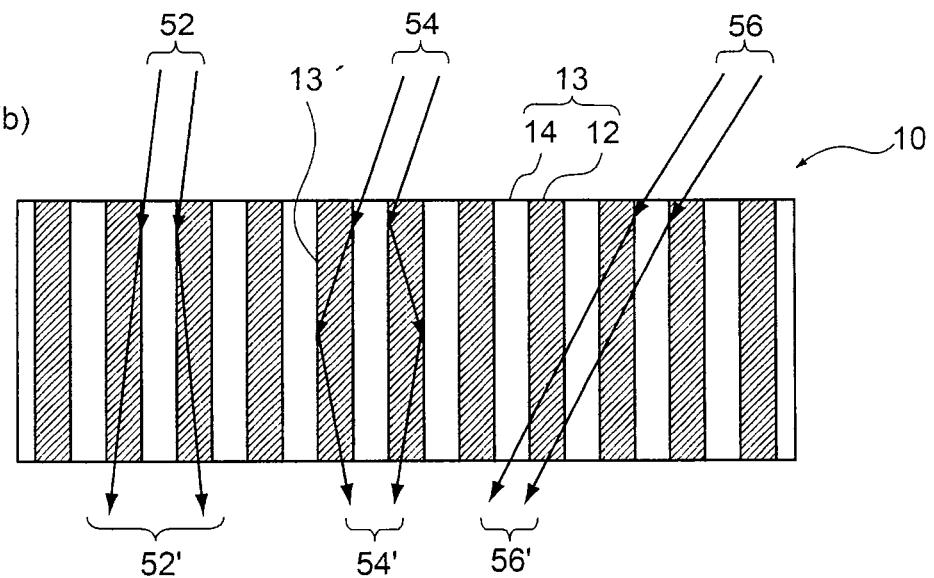

First, FIG. 1(a) shows a top view (plan view) of an anisotropic light diffusion film 10, and FIG. 1(b) shows a cross-sectional view of the anisotropic light diffusion film 10 illustrated in FIG. 1(a) in a case in which the anisotropic light diffusion film 10 is cut in a perpendicular direction along the dotted line A-A, and the cut surface is viewed from the direction indicated by the arrow.

Figure 2A:
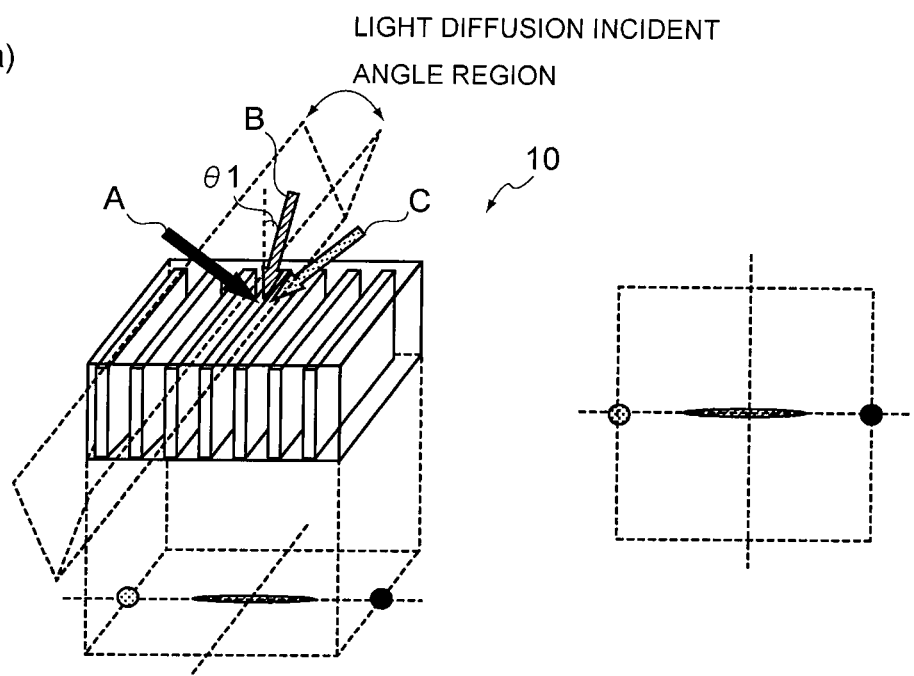
FIGS. 2(a) and 2(b) are diagrams provided in order to explain the incident angle dependency and anisotropic light diffusion in a light diffusion film which includes a louver structure inside the film.
Figure 2B:
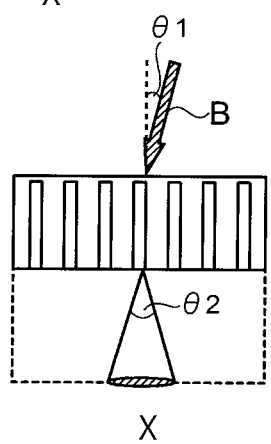

Furthermore, FIG. 2(a) shows an overall view of the anisotropic light diffusion film 10 which includes a louver structure inside the film, and FIG. 2(b) shows a cross-sectional view of the anisotropic light diffusion film 10 of FIG. 2(a) viewed from the X direction.

As shown in the plan view of FIG. 1(a), the anisotropic light diffusion film 10 is provided with a louver structure 13, in which plate-shaped regions with comparatively high refractive index 12 and plate-shaped regions with comparatively low refractive index 14 are alternately arranged in parallel in any one arbitrary direction along the film plane.

Furthermore, as shown in the cross-sectional view of FIG. 1(b), the plate-shaped regions with comparatively high refraction index 12 and the plate-shaped regions with comparatively low refractive index 14 have each a predetermined thickness and maintain the state of being alternately arranged in parallel even in the normal direction relative to the anisotropic light diffusion film (the film thickness direction).

As a result, as shown in FIG. 2(a), it is presumed that, when the angle of the incident light falls within a light diffusion incident angle region, it is diffused by the anisotropic light diffusion film 10.

Namely, as shown in FIG. 1(b), when the angle of the incident light relative to the anisotropic light diffusion film 10 has a value falling within a predetermined range of angles with respect to the boundary surface 13' of the louver structure 13, that is, a value in a light diffusion incident angle region, it is presumed that the incident light (52, 54), while changing direction, goes through the plate-shaped regions of the louver internal structure with comparatively high refraction index 12 along the film thickness, and thereby, the travelling direction of the light at the emitting surface side is not kept constant.

As a result, it is presumed that, when the incident light falls within the light diffusion incident angle region, it is diffused by the anisotropic light diffusion film 10 and becomes the diffused light (52', 54').

On the other hand, it is presumed that, when the angle of the incident light relative to the anisotropic light diffusion film 10 falls outside the light diffusion incident angle region, as shown in FIG. 1(*b*), the incident light 56 is directly transmitted through the anisotropic light diffusion film 10, without being diffused by the anisotropic light diffusion film, and becomes the transmitted light 56'.

Meanwhile, in the present invention, the term "light diffusion incident angle region" means, with respect to the light diffusion film, the range of angles of incident light corresponding to the emission of a diffused light, when the angle of incident light is changed from a point light source.

Figure 4A:
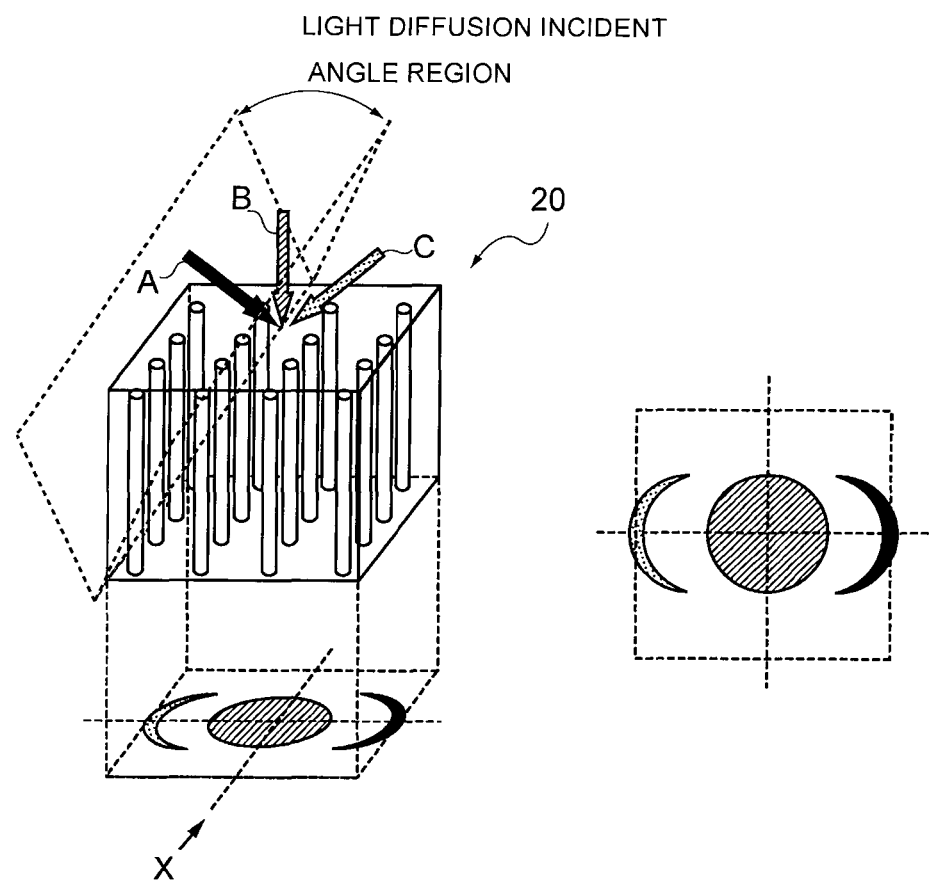
FIGS. 4(a) and 4(b) are diagrams provided in order to explain the incident angle dependency and isotropic light diffusion in a light diffusion film which includes a columnar structure inside the film.
Figure 4B:
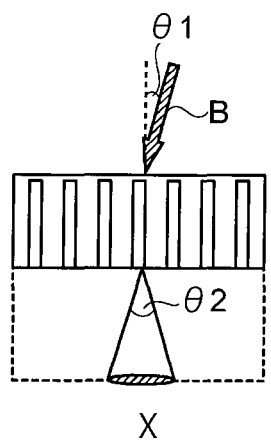

Furthermore, such a "light diffusion incident angle region" is, as illustrated in FIG. 2(*a*) and FIG. 4(*a*), an angle region determined for each light diffusion film, due to the difference in refractive index, the angle of inclination and the like of a louver structure or the like in the light diffusion film.

Based on the above-described fundamental principles, an anisotropic light diffusion film 10 provided with a louver structure 13, may exhibit, for example, an incident angle dependency in the transmission and diffusion of light as shown in FIG. 2(*a*).

Furthermore, as shown in FIG. 2(*a*), an anisotropic light diffusion film 10 which includes a louver structure 13, typically, exhibits light diffusion characteristics of "anisotropy".

Here, in the present invention, as shown in FIG. 2(*a*), the term "anisotropy" means that, when an incident light is diffused by the film, the diffusion state of light for the emitted light that has been diffused in a plane parallel to the film (shape of expansion of the diffused light) has different properties depending on the direction within the same plane.

More specifically, as illustrated in FIG. 2(*a*), it is speculated that, among the components included in an incident light, diffusion of light occurs selectively for a component that is perpendicular to the direction of the louver structure extended along any one arbitrary direction along the film plane, while diffusion of light does not occur easily for a component that is included in the incident light and is parallel to the direction of the louver structure, and therefore, anisotropic light diffusion is realized.

Therefore, as shown in FIG. 2(*a*), in a light diffusion film presenting anisotropy, the shape of expansion of the diffused light has a rod shape.

Furthermore, as described above, in an anisotropic light diffusion film, since the component of an incident light capable of contributing to light diffusion is a component that is perpendicular to the direction of the louver structure extended along any one arbitrary direction along the film plane, as illustrated in FIG. 2(*b*), the expression "incident angle θ1" of incident light is intended to mean the incident angle of a component that is perpendicular to the direction of the louver structure extended along ay one arbitrary direction along the film plane. Also, in this case, the incident angle θ1 is intended to mean the angle (°) when the angle with respect to the normal line of the incident side surface of the light diffusion film is designated as 0°.

Furthermore, in the present invention, the "light diffusion angle region" means the range of angles of the diffused light obtained by fixing a point light source at an angle for which the incident light is the most diffused.

Furthermore, in regard to an anisotropic light diffusion film, the "angle of aperture of diffused light" is the width of the "light diffusion angle region" described above, and as illustrated in FIG. 2(*b*), the "angle of aperture of diffused light" is intended to mean the angle of aperture θ2 of diffused light in a case in which a cross-section of the film is viewed from a direction parallel to the direction of the louver structure extended along any one arbitrary direction along the film plane.

Furthermore, as shown in FIG. 2(*a*), an anisotropic light diffusion film is such that, if the angle of the incident light is included in the light diffusion incident angle region, even if the incident angles are different, almost similar light diffusion can be induced at the light emitting surface side.

Therefore, it can be said that an anisotropic light diffusion film has a light-converging action of concentrating light to a predetermined spot.

Meanwhile, in addition to a case where the changes of direction of an incident light inside the region with comparatively high refractive index 12 of the louver structure are of a step-index type, with zigzag changes of direction by total reflection following a straight line as shown in FIG. 1(*b*), a case where they are of a gradient-index type, with changes of direction following a curve, is also considered.

Furthermore, in FIGS. 1(*a*) and 1(*b*), for simplicity, the interface between the plate-shaped region with comparatively high refractive index 12 and the plate-shaped region with comparatively low refractive index 14 is represented by a straight line but, in reality, the interface is slightly meandering and each of the plate-shaped regions is formed of a complex refractive index distribution structure with ramifications and extinctions.

As a result, it is presumed that a distribution of non-uniform optical properties enhances the light diffusion characteristics.

(2) Isotropic Light Diffusion

Next, a light diffusion film having isotropic light diffusion characteristics will be explained using FIGS. 3 and 4.

Figure 3A:
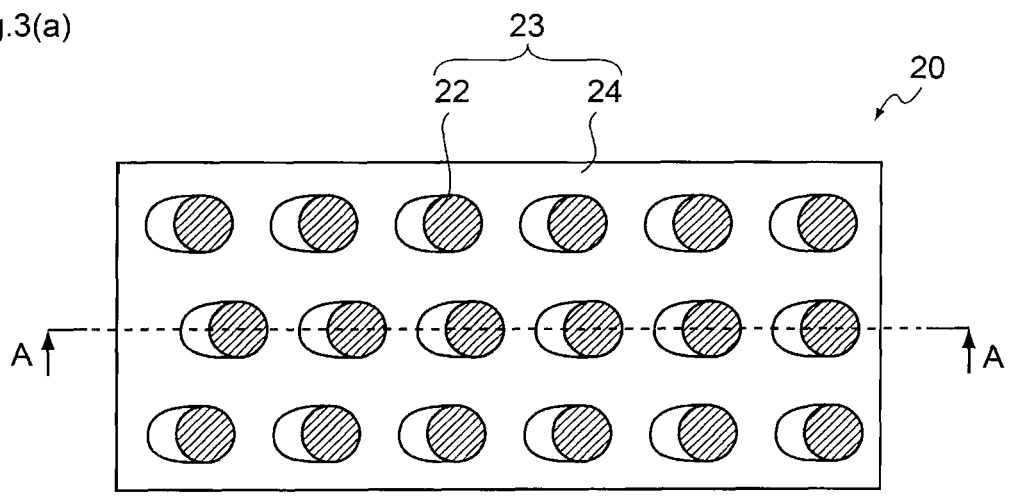
FIGS. 3(a) and 3(b) are diagrams provided in order to explain the outline of a light diffusion film which includes a columnar structure inside the film.

First, FIG. 3(*a*) illustrates a top view (plan view) of an isotropic light diffusion film 20, and FIG. 3(*b*) illustrates a cross-sectional view of the isotropic light diffusion film 20 in a case in which the isotropic light diffusion film 20 illustrated in FIG. 3(*a*) is cut in a perpendicular direction along the dotted line A-A, and the cut surface is viewed from the direction indicated by the arrow.

Furthermore, FIG. 4(*a*) shows an overall view of the isotropic light diffusion film 20 which includes a columnar structure inside the film, and FIG. 4(*b*) shows a cross-sectional view of the isotropic light diffusion film 20 of FIG. 4(*a*) viewed from the X direction.

In a plan view such as shown in FIG. 3(*a*), the isotropic light diffusion film 20 contains a columnar structure 23 composed of pillars with comparatively high refractive index 22 and a region with comparatively low refractive index 24.

Furthermore, as shown in the cross-sectional view of FIG. 3(*b*), the pillars with comparatively high refraction index 22 and the region with comparatively low refractive index 24 maintain the state of being alternately arranged in the normal direction relative to the isotropic light diffusion film 20 (the film thickness direction) with a predetermined width.

As a result, as shown in FIG. 4(*a*), it is presumed that, when the angle of the incident light falls within a light diffusion incident angle region, it is diffused by the isotropic light diffusion film 20.

Namely, as shown in FIG. 3(*b*), when the angle of the incident light relative to the isotropic light diffusion film 20 has a value falling within a predetermined range of angles with respect to the boundary surface 23' of the columnar structure 23, that is, a value in a light diffusion incident angle region, it is presumed that the incident light (62, 64), while changing direction, goes through the pillars with comparatively high refraction index 22 of the columnar structure along the film thickness, and thereby, the direction of travel of the light at the emitting surface side is not kept constant.

As a result, it is presumed that, when the incident light falls within the light diffusion incident angle region, it is diffused by the isotropic light diffusion film 20, and becomes the diffused light (62', 64').

Figure 3B:
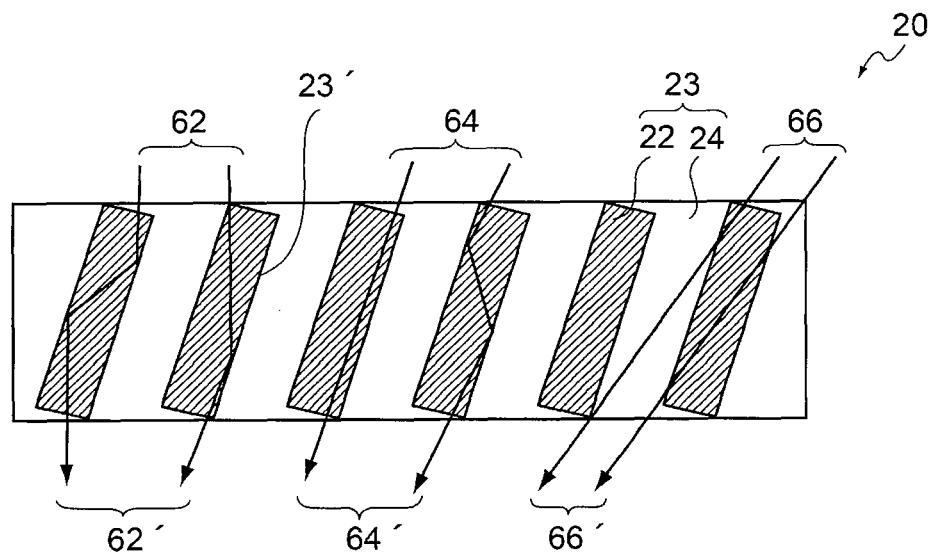

On the other hand, it is presumed that, when the angle of the incident light relative to the isotropic light diffusion film 20 falls outside the light diffusion incident angle region, as shown in FIG. 3(b), the incident light 66 is directly transmitted through the isotropic light diffusion film 20, without being diffused by the isotropic light diffusion film, and becomes the transmitted light 66'.

Therefore, based on the same fundamental principles as the above-described anisotropic light diffusion film, an isotropic light diffusion film 20 provided with a columnar structure 23 can exhibit, for example, an incident angle dependency with the transmission and diffusion of light as shown in FIG. 4(a).

However, as shown in FIG. 4(a), an isotropic light diffusion film which includes a columnar structure 23, typically, presents light diffusion characteristics of "isotropy".

This is speculated to be because the columnar structure 23 is not a structure that is continuously formed along any one arbitrary direction along the film plane as in the case of the louver structure 13.

Here, in the present invention, the term "isotropy" means that, as shown in FIG. 4(a), when an incident light is diffused by the film, the diffusion state of light for the emitted light that has been diffused in a plane parallel to the film (shape of expansion of the diffused light) does not change properties depending on the direction within the same plane.

More specifically, as shown in FIG. 4(a), the diffusion state of the emitted light that has been diffused has a circular shape in a plane parallel to the film.

Furthermore, in regard to an isotropic light diffusion film, the component of incident light that contributes to light diffusion is not particularly limited, unlike an anisotropic light diffusion film.

Therefore, the expression "incident angle θ1" of the incident angle in an isotropic film means, simply, the angle (°) in a case for which the angle relative to the normal of the incident side surface of the isotropic film is 0°.

Since other contents are redundant with the explanation of the above-described anisotropic light diffusion film, they will be omitted.

2. Component (A)

(1) Kind

The composition for light diffusion film of the present invention is characterized in that the composition includes a (meth)acrylic acid ester containing plural aromatic rings as component (A).

The reason for this is that, when a particular (meth)acrylic acid ester is incorporated as the component (A), it is speculated that a predetermined difference in the polymerization rate is produced between the component (A) and the component (B) by making the polymerization rate of the component (A) faster than the polymerization rate of the component (B), and thus copolymerizability of the two components can be effectively decreased.

As a result, when the composition is photocured, a predetermined internal structure such as a louver structure or a columnar structure, which is composed of a region originating from the component (A) and having a relatively high refractive index, and a region originating from the component (B) and having a relatively low refractive index, can be formed efficiently.

Furthermore, it is presumed that, by incorporating a particular (meth)acrylic ester as the component (A), sufficient compatibility with the component (B) is obtained when the component (A) is at the stage of a monomer, but at the stage of multiple connections in the course of polymerization, the compatibility with the component (B) can be decreased to a predetermined extent, and the predetermined internal structure can be formed even more efficiently.

Moreover, by incorporating a particular (meth)acrylic ester as the component (A), the refractive index of the region originating from the component (A) in the predetermined internal structure can be increased, and the difference thereof with the refractive index of the region originating from the component (B) can be adjusted to a value greater than or equal to a predetermined value.

Therefore, when a particular (meth)acrylic acid ester is incorporated as the component (A), together with the characteristics of the component (B) that will be described below, a predetermined internal structure such as a louver structure or a columnar structure, which is composed of a region originating from the component (A) and having a relatively high refractive index, and a region originating from the component (B) and having a relatively low refractive index, can be obtained efficiently.

Meanwhile, the term "(meth)acrylic ester containing a plurality of aromatic rings" means a compound having a plurality of aromatic rings in the ester residue moiety of the (meth)acrylic ester.

Furthermore, "(meth)acrylic" means both acrylic and methacrylic.

Furthermore, examples of a (meth)acrylic ester containing plural aromatic compounds as such a component (A) include biphenyl (meth)acrylate, naphthyl (meth)acrylate, anthracyl (meth)acrylate, benzylphenyl (meth)acrylate, biphenyloxyalkyl (meth)acrylate, naphthyloxyalkyl (meth)acrylate, anthracyloxyalkyl (meth)acrylate, benzylphenyloxyalkyl (meth)acrylate and the like, or compounds in which some of hydrogen atoms on the aromatic ring have been substituted by halogen, alkyl, alkoxy, halogenated alkyl, or the like.

Furthermore, it is preferable that the composition includes a compound containing a biphenyl ring as the (meth)acrylic acid ester containing plural aromatic rings as the component (A), and it is particularly preferable that the composition includes a biphenyl compound represented by the following Formula (2):

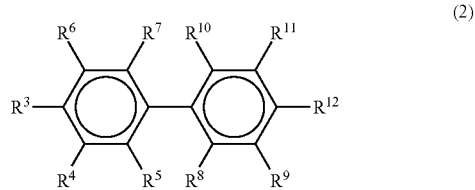

wherein in Formula (2), $R^3$ to $R^{12}$ are respectively independent of one another; at least one of $R^3$ to $R^{12}$ represents a substituent represented by the following Formula (3); and the others each represent any one substituent selected from a hydrogen atom, a hydroxyl group, a carboxyl group, an alkyl group, an alkoxy group, a halogenated alkyl group, a hydroxyalkyl group, a carboxyalkyl group, and a halogen atom;

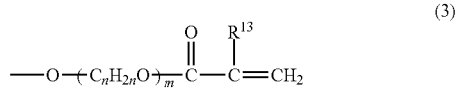
(3)

wherein in Formula (3), $R^{13}$ represents a hydrogen atom or a methyl group; the number of carbon atoms n represents an integer from 1 to 4; and the number of repetitions m represents an integer from 1 to 10.

The reason for this is that when the composition includes a biphenyl compound having a particular structure as the component (A), it is speculated that a predetermined difference is produced between the rates of polymerization of the component (A) and the component (B), thus compatibility between the component (A) and the component (B) is decreased to a predetermined extent, and thereby copolymerizability between the two components can be further decreased.

Furthermore, by increasing the refractive index of the region originating from the component (A) in the predetermined internal structure, the difference between the relevant refractive index and the refractive index of the region originating from the component (B) can be more easily adjusted to a value greater than or equal to a predetermined value.

Furthermore, in a case in which $R^3$ to $R^{12}$ in Formula (2) includes any of an alkyl group, an alkoxy group, a halogenated alkyl group, a hydroxyalkyl group, and a carboxyalkyl group, it is preferable that the number of carbon atoms of the alkyl moiety of the substituent is adjusted to a value within the range of 1 to 4.

The reason for this is that, if such a number of carbon atoms has a value of larger than 4, the polymerization rate of the component (A) decreases, or the refractive index of the region originating from the component (A) becomes too low, and it may be difficult to form the predetermined internal structure efficiently.

Therefore, in a case in which $R^3$ to $R^{12}$ in Formula (2) include any of an alkyl group, an alkoxy group, a halogenated alkyl group, a hydroxyalkyl group, and a carboxyalkyl group, it is more preferable to adjust the number of carbon atoms of the alkyl moiety of the substituent to a value within the range of 1 to 3, and it is even more preferable to adjust the number of carbon atoms to a value within the range of 1 to 2.

Furthermore, it is preferable that $R^3$ to $R^{12}$ in Formula (2) each represent a substituent other than a halogenated alkyl group or a halogen atom, that is, a substituent that does not contain halogen.

The reason for this is that generation of dioxin is prevented when the light diffusion film is incinerated or the like, and thereby it is preferable from the viewpoint of environmental protection.

Meanwhile, in regard to a conventional light diffusion film, it has been general, on the occasion of obtaining a predetermined internal structure, to subject a monomer component to halogen substitution for the purpose of imparting a higher refractive index to the monomer component.

From this point of view, when a biphenyl compound represented by Formula (2) is used, a high refractive index can be obtained even if halogen substitution is not performed.

Therefore, with a light diffusion film that is obtained by photocuring the composition for light diffusion film according to the invention, satisfactory incident angle dependency can be manifested even if the light diffusion film does not contain halogen.

Furthermore, it is preferable that any one of $R^4$ to $R^{11}$ in Formula (2) represents a substituent represented by Formula (3).

The reason for this is that when the position of the substituent represented by Formula (3) is set to a position other than the positions of $R^3$ and $R^{12}$, the molecules of the component (A) can be effectively prevented from being oriented and crystallized in a stage before the composition is photocured.

Furthermore, the compound is liquid at the monomer stage prior to photocuring, and the compound can be apparently uniformly mixed with the component (B) even if a diluent solvent or the like is not used.

It is because, in the photocuring stage, aggregation/phase separation at a fine level of the component (A) and the component (B) is enabled, and a light diffusion film having the predetermined internal structure can be obtained more efficiently.

Furthermore, from a similar point of view, it is particularly preferable that any one of $R^5$, $R^7$, $R^8$ and $R^{10}$ in Formula (2) represents a substituent represented by Formula (3).

Furthermore, it is usually preferable that the number of repetitions m for the substituent represented by Formula (3) is defined as an integer from 1 to 10.

The reason for this is that, if the number of repetitions m has a value exceeding 10, the oxyalkylene chain that links the polymerization site and the biphenyl ring becomes too long, and polymerization of the molecules of the component (A) at the polymerization site may thereby be inhibited.

Therefore, it is more preferable that the number of repetitions m for the substituent represent by Formula (3) is defined as an integer from 1 to 4, and particularly preferably to an integer of 1 or 2.

In addition, from a similar point of view, it is usually preferable that the number of carbon atoms n for the substituent represented by Formula (3) is defined as an integer from 1 to 4.

Furthermore, when it is also considered that the position of the polymerizable carbon-carbon double bond, which serves as a site of polymerization, is so close to the biphenyl ring that the biphenyl ring becomes a steric hindrance, and thus the polymerization rate of the component (A) decreases, it is more preferable that the number of carbon atoms n for the substituent represented by Formula (3) is defined as an integer from 2 to 4, and particularly preferably to an integer from 2 to 3.

Furthermore, specific preferred examples of the biphenyl compound represented by Formula (2) include compounds represented by the following Formulas (4) and (5):

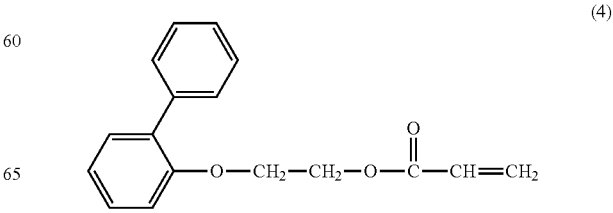
(4)

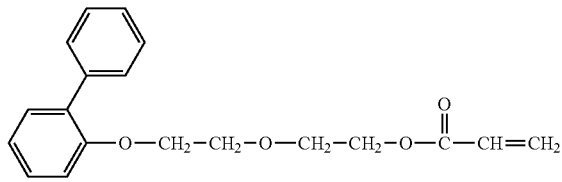

(2) Molecular Weight

Furthermore, it is preferable to adjust the molecular weight of the component (A) to a value within the range of 200 to 2,500.

The reason for this is that, by adjusting the molecular weight of the component (A) to a value in a predetermined range, it is presumed that the polymerization rate of the component (A) can be made faster, and copolymerizability of the component (A) and the component (B) can be decreased more effectively.

As a result, when the composition is photocured, a predetermined internal structure such as a louver structure or a columnar structure, which is composed of a region originating from the component (A) and having a relatively high refractive index, and a region originating from the component (B) and having a relatively low refractive index, can be formed more efficiently.

That is, this is because, if the molecular weight of the component (A) has a value of below 200, it is speculated that the polymerization rate is decreased due to steric hindrance and becomes close to the polymerization rate of the component (B), and copolymerization of the component (A) with the component (B) is likely to occur, and as a result, it may be difficult to form a predetermined internal structure efficiently. On the other hand, it is because if the molecular weight of the component (A) has a value of above 2,500, it is speculated that the difference in the molecular weight between the component (A) and the component (B) is decreased, while the polymerization rate of the component (A) decreases and becomes close to the polymerization rate of the component (B), so that copolymerization of the component (A) with the component (B) occurs more easily, and as a result, it may be difficult to form a predetermined internal structure efficiently.

Therefore, it is more preferable to adjust the molecular weight of the component (A) to a value within the range of 240 to 1,500, and even more preferably to a value within the range of 260 to 1,000.

Meanwhile, the molecular weight of the component (A) can be determined from the calculated value obtainable from the composition of the molecules and the atomic weight of the constituent atoms, or can be measured as the weight average molecular weight using gel permeation chromatography (GPO).

(3) Single Use

Furthermore, the composition for light diffusion film according to the present invention is characterized by including the component (A) as a monomer component that forms the region with comparatively high refractive in the predetermined internal structure, but it is preferable that the component (A) be included as a single component.

The reason for this is that when such a configuration is adopted, the fluctuations in the region originating from the component (A) can be suppressed effectively, and a light diffusion film having a predetermined internal structure can be obtained more efficiently.

That is, when the compatibility of the component (A) with the component (B) is low, for example, when the component (A) is a halogen-based compound or the like, another component (A) (for example, a non-halogen-based compound) may be used jointly as a third component for making the component (A) compatible with the component (B).

However, in that case, the refractive index in the region with comparatively high refractive index, originating from the component (A), may fluctuate or may become prone to decrease, due to the influence of such a third component.

As a result, the difference in refractive index with the region with comparatively low refractive index, originating from the component (B), may become non-uniform, or may be prone to decrease excessively.

Therefore, it is preferable to select a high refractive index monomer component having compatibility with the component (B), and use that monomer component as a single component (A).

Meanwhile, for example, since the biphenyl compound represented by Formula (4) as the component (A) has low viscosity, the compound is compatible with the component (B), and therefore, the biphenyl compound can be used alone as the component (A).

(4) Refractive Index

Furthermore, it is preferable to adjust the refractive index of the component (A) to a value within the range of 1.5 to 1.65.

The reason for this is that when the refractive index of the component (A) is adjusted to a value in such a range, the difference between the refractive index of the region originating from the component (A) and the refractive index of the region originating from the component (B) can be more easily adjusted, and a light diffusion film having a predetermined internal structure can be obtained more efficiently.

That is, if the refractive index of the component (A) has a value of below 1.5, the difference between the refractive index of the component (A) and the refractive index of the component (B) becomes too small, and it may be difficult to obtain an effective light diffusion angle region. On the other hand, if the refractive index of the component (A) has a value exceeding 1.65, the difference between the refractive index of the component (A) and the refractive index of the component (B) becomes large, but it may be difficult to even form an apparent compatibility with the component (B).

Therefore, it is more preferable to adjust the refractive index of the component (A) to a value within the range of 1.52 to 1.62 and even more preferable to a value within the range of 1.56 to 1.6.

Meanwhile, the refractive index of the component (A) means the refractive index of the component (A) prior to photocuring.

Furthermore, the refractive index can be measured according to JIS K0062.

(5) Content

Furthermore, the composition for light diffusion film is characterized in that the content of the component (A) in the composition is adjusted to a value within the range of 25 parts to 400 parts by weight relative to 100 parts by weight of the component (B) described below.

The reason for this is that, if the content of the component (A) has a value of below 25 parts by weight, the existence ratio of the component (A) to the component (B) becomes smaller, the region originating from the component (A) becomes excessively small, and it may be difficult to form a predetermined internal structure having satisfactory incident angle dependency. On the other hand, it is because if the content of the component (A) has a value of above 400 parts by weight, the existence ratio of the component (A) to the component (B) becomes larger, the region originating from the component (A) becomes excessively large, and on the contrary, it may be difficult to form a predetermined internal structure having satisfactory incident angle dependency.

Therefore, it is more preferable to set the content of the component (A) to a value within the range of 40 parts to 300 parts by weight, and even more preferably to a value within the range of 50 parts to 200 parts by weight, relative to 100 parts by weight of the component (B).

3. Component (B)

(1) Kind

The composition for light diffusion film of the present invention is characterized in that the composition includes a urethane (meth)acrylate as component (B).

The reason for this is that, if urethane (meth)acrylate is used, the difference between the refractive index of the region originating from the component (A) and the refractive index of the region originating from the component (B) can be adjusted more easily, the fluctuations in the refractive index of the region originating from the component (B) are effectively suppressed, and thus, a light diffusion film having the predetermined internal structure can be obtained more efficiently.

Meanwhile, (meth)acrylate means both acrylate and methacrylate.

First, urethane (meth)acrylate is formed from (B1) a compound containing at least two isocyanate groups; (B2) a polyol compound, preferably a diol compound, and particularly preferably polyalkylene glycol; and (B3) hydroxyalkyl (meth)acrylate.

Meanwhile, the component (B) is intended to include an oligomer having a repeating unit of urethane bond.

Among these, examples for the component (B1), the compound containing at least two isocyanate groups, include aromatic polyisocyanates such as 2,4-tolylene diisocyanate, 2,6-tolylene diisocyanate, 1,3-xylylene diisocyanate, and 1,4-xylylene diisocyanate; aliphatic polyisocyanates such as hexamethylene diisocyanate; alicyclic polyisocyanates such as isophorone diisocyanate (IPDI) and hydrogenated diphenylmethane diisocyanate; biuret forms and isocyanurate forms thereof; and adducts that are reaction products with low molecular weight active hydrogen-containing compounds and the like such as ethylene glycol, propylene glycol, neopentyl glycol, trimethylolpropane, and castor oil (for example, xylylene diisocyanate-based trifunctional adduct).

Furthermore, among the compounds described above, it is particularly preferable to have an alicyclic polyisocyanate.

The reason for this is that alicyclic polyisocyanates are likely to provide differences in the reaction rates of the various isocyanate groups in relation to the conformation or the like, as compared with aliphatic polyisocyanates.

Thereby, the reactions of the component (B1) with only the component (B2), or the component (B1) with only the component (B3) can be inhibited, and the component (B1) can react reliably with the component (B2) and the component (B3), so that generation of excess byproducts can be prevented.

As a result, the fluctuations in the refractive index of the region originating from the component (B), that is, the low refractive region, can be suppressed effectively.

Furthermore, when an alicyclic polyisocyanate is used, compatibility between the component (B) and the component (A) thus obtained can be decreased to a predetermined extent, and a predetermined internal structure can be formed more efficiently, as compared with aromatic polyisocyanates.

Moreover, when an alicyclic polyisocyanate is used, the refractive index of the component (B) thus obtained can be reduced as compared with aromatic polyisocyanates. Therefore, the difference between the refractive index of the component (B) and the refractive index of the component (A) can be increased, so that light diffusibility is exhibited more reliably, and also, the predetermined internal structure having high uniformity of diffused light in the light diffusion angle region can be formed even more efficiently.

Furthermore, among such alicyclic polyisocyanates, a compound containing two isocyanate groups via an aliphatic ring is preferred.

The reason for this is that, with such an alicyclic diisocyanate, the alicyclic diisocyanate quantitatively reacts with the component (B2) and the component (B3), and a single component (B) can be obtained.

Particularly preferred examples of such an alicyclic diisocyanate include isophorone diisocyanate (IPDI).

The reason for this is that a significant difference can be provided in the reactivity of two isocyanate groups.

Furthermore, among the components that form the urethane (meth)acrylate, examples of the polyalkylene glycol as the component (B2) include polyethylene glycol, polypropylene glycol, polybutylene glycol, and polyhexylene glycol, and among them, polypropylene glycol is particularly preferred.

The reason for this is that, with polypropylene glycol, when the component (B) is cured, polypropylene glycol forms a satisfactory soft segment in the cured product, and can effectively enhance handleability or mountability of the light diffusion film.

Meanwhile, the weight average molecular weight of the component (B) can be adjusted mainly by the weight average molecular weight of the component (B2). Here, the weight average molecular weight of the component (B2) is usually 2,300 to 19,500, preferably 4,300 to 14,300, and particularly preferably 6,300 to 12,300.

Furthermore, among the components forming urethane (meth)acrylate, for the component (B3), examples of hydroxyalkyl (meth)acrylate include 2-hydroxyethyl (meth) acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate and the like.

Furthermore, from the viewpoint of decreasing the polymerization rate of the urethane (meth)acrylate thus obtainable, and more efficiently forming the predetermined internal structure, the component is more preferably hydroxyalkyl methacrylate, and even more preferably 2-hydroxyethyl methacrylate.

Furthermore, synthesis of the urethane (meth)acrylate based on the components (B1) to (B3) can be carried out by a conventional method.

In this case, it is preferable to adjust the mixing ratio of the components (B1) to (B3) to a mole ratio of component (B1):component (B2):component (B3)=1 to 5:1:1 to 5.

The reason for this is that, with such a mixing ratio, a urethane (meth)acrylate can be efficiently synthesized, in which each one of the isocyanate groups carried by the components (B1) has reacted with the two hydroxyl groups carried by the component (B2) and bonded thereto, and the hydroxyl groups carried by the component (B3) have reacted with the other isocyanate group respectively carried by the two components (B1) and bonded thereto.

Therefore, it is more preferable to adjust the mixing ratio of the components (B1) to (B3) to a molar ratio of component (B1):component (B2):component (B3)=1 to 3:1:1 to 3, and even more preferably to the ratio of 2:1:2.

(2) Weight Average Molecular Weight

Furthermore, it is preferable to adjust the weight average molecular weight of the component (B) to a value within the range of 3,000 to 20,000.

The reason for this is that when the weight average molecular weight of the component (B) is adjusted to a predetermined range, it is speculated that a predetermined difference can be produced between the polymerization rates of the component (A) and the component (B), and copolymerizability of the two components can be effectively decreased.

As a result, when the composition is photocured, a predetermined internal structure such as a louver structure or a columnar structure, which is composed of a region originating from the component (A) and having a relatively high refractive index, and a region originating from the component (B) and having a relatively low refractive index, can be formed efficiently.

That is, if the weight average molecular weight of the component (B) has a value of below 3,000, the polymerization rate of the component (B) is increased and gets closer to the polymerization rate of the component (A), so that copolymerization with the component (A) is likely to occur, and as a result, it may be difficult to form the predetermined internal structure efficiently. On the other hand, it is because, if the weight average molecular weight of the component (B) has a value of above 20,000, it may be difficult to form a predetermined internal structure, compatibility of the component (B) with the component (A) is excessively decreased, and thereby the component (A) may be precipitated out or the like during the application stage.

Therefore, it is more preferable to adjust the weight average molecular weight of the component (B) to a value within the range of 5,000 to 15,000, and even more preferable to adjust it to a value within the range of 7,000 to 13,000.

Meanwhile, the weight average molecular weight of the component (B) can be measured using gel permeation chromatography (GPC).

(3) Single Use

Furthermore, for the component (B), two or more kinds thereof having different molecular structures or different weight average molecular weights may be used in combination; however, from the viewpoint of suppressing fluctuations in the refractive index of the region originating from the component (B) in the predetermined internal structure, it is preferable to use only one kind.

That is, it is because when a plurality of compounds are used for the component (B), the refractive index for the region with comparatively low refractive index originating from the component (B) may fluctuate or increase, and the difference of refractive index with the region with comparatively high refractive index originating from the component (A) may become non-uniform or decrease excessively.

(4) Refractive Index

Furthermore, it is preferable to adjust the refractive index of the component (B) to a value within the range of 1.4 to 1.55.

The reason for this is that, by adjusting the refractive index of the component (B) to a value in such a range, the difference between the refractive indices of the region originating from the component (A) and the region originating from the component (B) can be easily adjusted, and a light diffusion film having a predetermined internal structure can be obtained more efficiently.

That is, if the refractive index of the component (B) has a value of below 1.4, the difference between the refractive indices of the component (B) and the component (A) is increased, but the compatibility with the component (A) deteriorates to an extreme degree, and there is concern about not being able to form the predetermined internal structure. On the other hand, if the refractive index of the component (B) exceeds 1.55, the difference between the refractive indices of the component (B) and the component (A) becomes too small, and it may be difficult to obtain the desired incident angle dependency.

Therefore, it is more preferable to adjust the refractive index of the component (B) to a value within the range of 1.45 to 1.54, and even more preferably to a value within the range of 1.46 to 1.52.

Meanwhile, the refractive index of the component (B) described above means the refractive index of the component (B) prior to photocuring.

The refractive index can be measured, for example, according to JIS K0062.

Furthermore, it is preferable to adjust the difference between the refractive indices of the component (A) and the component (B) to a value of 0.01 or more.

The reason for this is that, when such difference in refractive index is adjusted to a value in a predetermined range, a light diffusion film can be obtained, which has more satisfactory incident angle dependency in connection with the transmission and the diffusion of light, and has a broader light diffusion incident angle region.

That is, if such difference in refractive index has a value of below 0.01, because the range of angles at which the incident light undergoes total reflection in the predetermined internal structure narrows, the angle of aperture in the light diffusion may become excessively narrow. On the other hand, if such difference in refractive index becomes excessively large, the compatibility between the component (A) and the component (B) deteriorates too much, and there is concern about not being able to form the predetermined internal structure.

Therefore, it is more preferable to adjust the difference between the refractive indices of the component (A) and the component (B) to a value within the range of 0.05 to 0.5, and even more preferable to adjust it to a value within the range of 0.1 to 0.2.

Meanwhile, the refractive indices of the component (A) and the component (B) mean the refractive indices of the component (A) and the component (B) prior to photocuring.

(5) Content

Furthermore, it is preferable that the content of the component (B) in the composition for light diffusion film is adjusted to a value within the range of 10 parts to 80 parts by weight relative to 100 parts by weight of the total amount of the composition for light diffusion film.

The reason for this is that, if the content of the component (B) has a value of below 10 parts by weight, the existence ratio of the component (B) to the component (A) becomes smaller, the region originating from the component (B) becomes excessively small compared with the region originating from the component (A), and it may be difficult to obtain a predetermined internal structure having satisfactory incident angle dependency. On the other hand, it is because, when the content of the component (B) has a value of above 80 parts by weight, the existence ratio of the component (B) to the component (A) becomes larger, the region originating from the component (B) becomes excessively large compared with the region originating from the component (A), and on the contrary, it may be difficult to obtain a predetermined internal structure having satisfactory incident angle dependency.

Therefore, it is more preferable that the content of the component (B) is adjusted to a value within the range of 20 parts to 70 parts by weight, and even more preferably to a value within the range of 30 parts to 60 parts by weight, relative to 100 parts by weight of the total amount of the composition for light diffusion film.

4. Component (C)

(1) Kind

Furthermore, the composition for light diffusion film is characterized in that the composition includes a photopolymerization initiator as component (C).

The reason for this is that when the composition for light diffusion film is irradiated with active energy radiation, a predetermined internal structure such as a louver structure or a columnar structure, which is composed of a region originating from the component (A) and having a relatively high refractive index, and a region originating from the component (B) and having a relatively low refractive index, can be formed efficiently.

Here, the photopolymerization initiator refers to a compound which generates a radical species when irradiated with active energy radiation such as ultraviolet radiation.

Examples of such a photopolymerization initiator include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholinopropan-1-one, 4-(2-hydroxyethoxy)phenyl 2-(hydroxy-2-propyl) ketone, benzophenone, p-phenylbenzophenone, 4,4-diethylaminobenzophenone, dichlorobenzophenone, 2-methylanthraquinone, 2-ethylanthraquinone, 2-tertiary-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylamine benzoic acid ester, and oligo[2-hydroxy-2-methyl-1-[4-(1-methylvinyl)phenyl]propane]. Among these, one type of compound may be used alone, or two or more types of compounds may be used in combination.

Furthermore, it is preferable that the component (C) is an α-hydroxyacetophenone type photopolymerization initiator.

The reason for this is that, with such a photopolymerization initiator, a light diffusion film having more satisfactory incident angle dependency in transmission and diffusion of light can be obtained.

That is, it is because, on the occasion of forming a louver structure or a columnar structure, it is speculated that in order to increase the difference between the refractive indices of the regions originating from the component (A) and the component (B), curing can be achieved while separation between these components is promoted more effectively.

(2) Content

Furthermore, the present invention is characterized in that the content of the component (C) in the composition for light diffusion film is adjusted to a value within the range of 0.2 parts to 20 parts by weight relative to the total amount, taken as 100 parts by weight, of the component (A) and the component (B).

The reason for this is that, if the content of the component (C) has a value of below 0.2 parts by weight, it is difficult to obtain a light diffusion film having sufficient incident angle dependency, and there may be an excessively small number of polymerization starting points so that it may be difficult to sufficiently photocure the film. On the other hand, it is because, if the content of the component (C) has a value of above 20 parts by weight, ultraviolet absorption at the surface layer of the coating layer may be excessively intensified, and rather, photocuring of the film may be inhibited, foul odor may become excessively strong, or the initial yellow tinge of the film may become intense.

Therefore, it is more preferable that the content of the component (C) is adjusted to a value within the range of 0.5 parts to 15 parts by weight, and even more preferably to a value within the range of 1 part to 10 parts by weight, relative to the total amount, taken as 100 parts by weight, of the component (A) and the component (B).

5. Component (D)

(1) Kind

Also, the composition for light diffusion film of the present invention is characterized in that the composition includes a hindered amine-based photostabilizer as component (D).

The reason for this is that, by incorporating a hindered amine-based photostabilizer as the component (D)<when the composition is photocured, excellent weather resistance can be imparted to the resulting light diffusion film, without inhibiting the formation of a predetermined internal structure such as a louver structure or a columnar structure, which is composed of a region originating from the component (A) and having a relatively high refractive index, and a region originating from the component (B) and having a relatively low refractive index.

On the other hand, it is because, if an ultraviolet absorber is added to the composition for light diffusion film, when the composition for light diffusion film is irradiated with active energy radiation in order to form a predetermined internal structure, the ultraviolet absorber absorbs ultraviolet radiation, and therefore, it may be difficult to form a well-defined internal structure within the film, while even curing of the film may be difficult.

Incidentally, weather resistance of the light diffusion film can also be enhanced by further laminating an ultraviolet absorbing layer on the light diffusion film, or by adding an ultraviolet absorber to the adhesive layer or the like that is formed on the light diffusion film.

However, in that case, there may be many problems such as that the layer thickness is increased, delamination is likely to occur, or the production process may become complicated.

From this point of view, with the light diffusion film of the present invention, since weather resistance is imparted to the light diffusion film itself, the various problems described above can be fundamentally solved.

Here, the effect of the hindered amine-based photostabilizer will be described.

That is, a hindered amine-based photostabilizer has an effect of restoring the energy state of a substance that has been excited by ultraviolet irradiation to a ground state, and emitting the energy of the restored portion as heat.

Therefore, the substance that has been excited by ultraviolet irradiation to a chemical reaction is prevented from causing a chemical reaction, and the occurrence of weathering deterioration called yellowing of the film can be effectively suppressed.

Furthermore, in a hindered amine-based photostabilizer, since the absorption wavelength is shifted from the wavelength of ultraviolet radiation used by the photocuring reaction, the hindered amine-based photostabilizer does not inhibit radical generation from a photopolymerization initiator when the film is photocured.

Therefore, the hindered amine-based photostabilizer does not have the effect of absorbing ultraviolet radiation and inhibiting the formation of an internal structure within the film, as in the case of having an ultraviolet absorber added to the composition.

Therefore, when a hindered amine-based photostabilizer is incorporated as the component (D), when the composition is photocured, excellent weather resistance can be imparted to the resulting light diffusion film, without inhibiting the formation of a predetermined internal structure such as a louver structure or a columnar structure, which is composed of a region originating from the component (A) and having a relatively low refractive index, and a region originating from the component (B) and having a relatively low refractive index.

Meanwhile, a hindered amine-based photostabilizer does not capture a radical that is generated from a photopolymerization initiator at the time of performing photocuring, but captures a radical that is generated in a light diffusion film thus obtained.

This is because a radical generated from a photopolymerization initiator at the time of performing photocuring reacts preferentially due to the component (A) and the component (B) having relatively faster reaction rates, and is supplied to the formation of a predetermined internal structure, while since a radical generated in a resulting light diffusion film does not have any material with which the radical reacts, the radical is captured by the hindered amine-based photostabilizer.

Furthermore, it is preferable that the component (D) is a hindered amine-based photostabilizer represented by the following Formula (1):

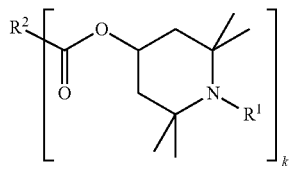

(1)

wherein in Formula (1), $R^1$ represents a hydrogen atom, an alkyl group having 1 to 10 carbon atoms, or an alkoxy group having 1 to 10 carbon atoms; $R^2$ represents a hydrogen atom, a k-valent aliphatic hydrocarbon group having 1 to 10 carbon atoms, a k-valent alicyclic hydrocarbon group having 3 to 20 carbon atoms, a k-valent aromatic hydrocarbon group having 6 to 20 carbon atoms, a k-valent aryl group having 7 to 30 carbon atoms, a k-valent heterocyclic aromatic hydrocarbon group having 3 to 20 carbon atoms, or a monovalent fatty acid in which the number of carbon atoms of the carbon chain moiety having an ester moiety formed with an alcohol having 1 to 10 carbon atoms at the end on the opposite side of the piperidine skeleton is 1 to 20; and k represents an integer from 1 to 3.

The reason for this is that, with a hindered amine-based photostabilizer represented by Formula (1), a light diffusion film having superior weather resistance can be obtained.

Furthermore, it is because such a hindered amine-based photostabilizer is liquid at room temperature, has excellent miscibility into the composition for light diffusion film, and can enhance storage stability of the resulting composition for light diffusion film.

Therefore, it is more preferable that $R^1$ is an alkyl group having 1 to 5 carbon atoms or an alkoxy group having 3 to 10 carbon atoms, and it is even more preferable that $R^1$ is an alkyl group having 1 to 3 carbon atoms or an alkoxy group having 5 to 9 carbon atoms.

Furthermore, it is more preferable that $R^2$ is a divalent aliphatic hydrocarbon group having 3 to 15 carbon atoms, or a monovalent fatty acid in which the number of carbon atoms of the carbon chain moiety having an ester moiety formed with an alcohol having 1 to 5 carbon atoms at the end on the opposite side of the piperidine skeleton is 3 to 15; and it is even more preferable that $R^2$ is a monovalent fatty acid alkyl group in which the number of carbon atoms of the carbon chain moiety having an ester moiety formed with an alcohol having 1 to 3 carbon atoms at the end on the opposite side of the piperidine skeleton is 5 to 10.

Also, it is more preferable to set k to 1 or 2.

Furthermore, specific preferred examples of the hindered amine-based photostabilizer represented by Formula (1) include compounds represented by the following Formulas (6) to (9):

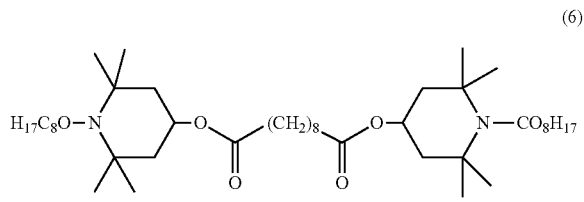

(6)

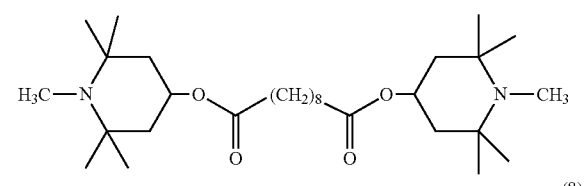

(7)

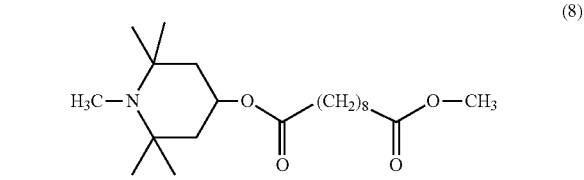

(8)

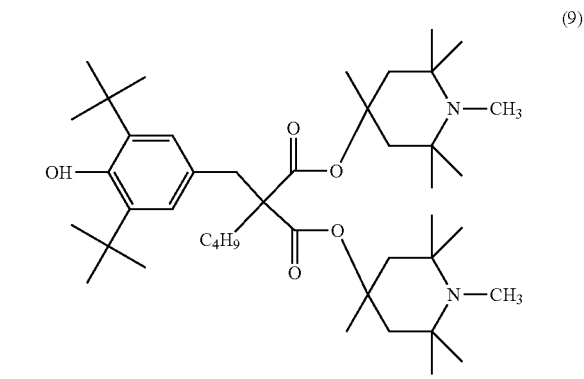

(9)

In addition to the compounds described above, commercially available hindered amine-based photostabilizers can be used.

Examples thereof include CHIMASSORB 119, CHIMASSORB 2020, CHIMASSORB 944, TINUVIN 622, TINUVIN B75, TINUVIN 783, TINUVIN 111, TINUVIN 791, TINUVIN C353, TINUVIN 494, TINUVIN 492, TINUVIN 123, TINUVIN 144, TINUVIN 152, TINUVIN 292, TINUVIN 5100, TINUVIN 765, TINUVIN 770, TINUVIN XT850, TINUVIN XT855, TINUVIN 440, TINUVIN NOR371 (all manufactured by Ciba Japan K.K.); ADEKASTAB LA-52, ADEKASTAB LA-57, ADEKASTAB LA-62, ADEKASTAB LA-67, ADEKASTAB LA-63, ADEKASTAB LA-68 LD, ADEKASTAB LA-82, ADEKASTAB LA-87, ADEKASTAB LA-501, ADEKASTAB LA-502 XP, ADEKASTAB LA-503, ADEKASTAB LA-77, ADEKASTAB LX-335, ADEKANOL UC-605 (all manufactured by ADEKA Corp.); SANOL LS770, SANOL LS765, SANOL LS292, SANOL LS440, SANOL LS744, SANOL LS2626, SANOL LS944 (all manufactured by Sankyo Lifetech Co., Ltd.); HOSTAVIN N20, HOSTAVIN N24, HOSTAVIN N30, HOSTAVIN N321, HOSTAVIN PR31, HOSTAVIN 3050, HOSTAVIN 3051, HOSTAVIN 3052, HOSTAVIN 3053, HOSTAVIN 3055, HOSTAVIN 3058, HOSTAVIN 3063, HOSTAVIN 3212, HOSTAVIN TB01, HOSTAVIN TB02, NYLOSTAB S-EED (all manufactured by Clariant Japan K.K.); TOMISORB 77 (manufactured by Yoshitomi Fine Chemicals, Ltd.); CYASORB UV3346, CYASORB UV3529, CYASORB UV3853 (manufactured by Sun Chemical Corp.); SUMISORB TM61 (manufactured by Sumitomo Chemical Co., Ltd.); GOODRITE UV3159, GOODRITE UV3034, GOODRITE UV3150, GOODRITE 3110×128 (all manufactured by BF Goodrich Co.); UVINUL 4049, UVINUL 4050, and UVINUL 5050 (all manufactured by BASF SE).

(2) Content

Furthermore, the composition for light diffusion film is characterized in that the content of the component (D) in the composition is adjusted to a value within the range of 0.1 parts to 10 parts by weight relative to the total amount, taken as 100 parts by weight, of the component (A) and the component (B).

That is, it is because if the content of the component (D) has a value of below 0.1 parts by weight, the effect of imparting weather resistance to the light diffusion film may become insufficient. On the other hand, it is because if the content of the component (D) has a value of above 10 parts by weight, there is a possibility that transparency of the resulting light diffusion film may be impaired, and there is also a possibility that durability may be excessively decreased. Also, even in consideration of economic efficiency, the amount of addition should be lowered to the minimum necessary.

Therefore, it is more preferable that the content of the component (D) is adjusted to a value within the range of 0.2 parts to 8 parts by weight, and even more preferably to a value within the range of 0.4 parts to 6 parts by weight, relative to the total amount, taken as 100 parts by weight, of the component (A) and the component (B).

Next, the relationship between the content of the hindered amine-based photostabilizer as the component (D) and the weather resistance of the light diffusion film will be explained using FIG. 5.

Figure 5:
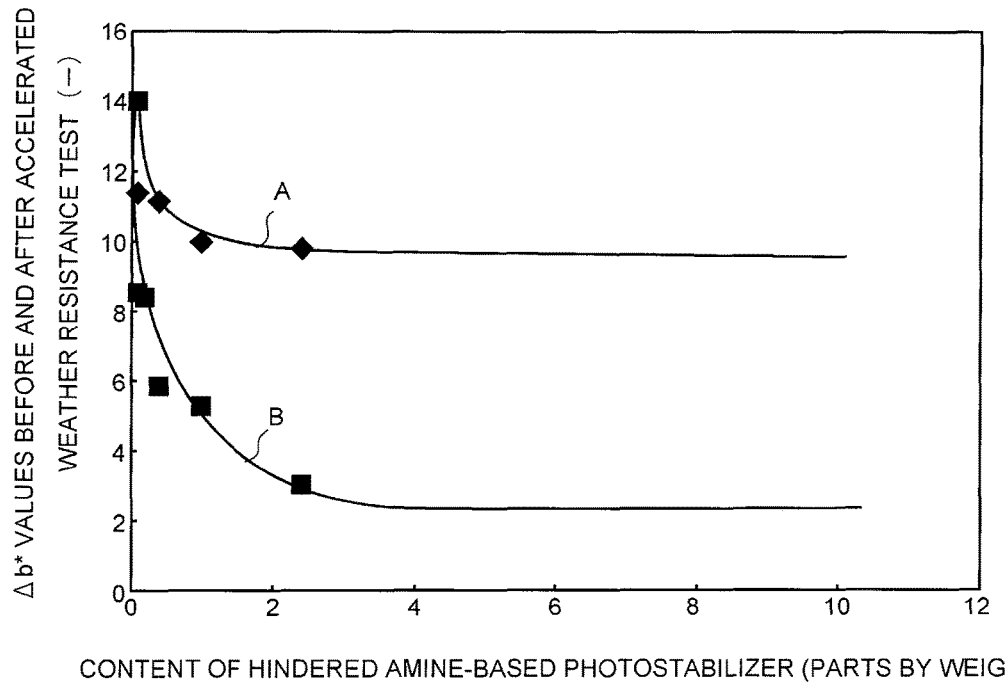
FIG. 5 is a diagram provided in order to explain the relationship between the amount of addition of a hindered amine-based photostabilizer and the weather resistance of the light diffusion film.

That is, FIG. 5 shows characteristic curves A and B, each plotting the content (parts by weight) of the component (D) relative to the total amount, taken as 100 parts by weight, of the component (A) and the component (B) on the horizontal axis, and plotting the $\Delta b^*$ value, which is the difference between the $b^*$ values of the light diffusion film before and after an accelerated weather resistance test (($b^*$ value after accelerated weather resistance test)−(initial $b^*$ value)) (−) on the vertical axis.

Here, the characteristic curve A is a characteristic curve in the case of using a compound represented by Formula (6) as a hindered amine-based photostabilizer, and the characteristic curve B is a characteristic curve in the case of using a mixture of compounds represented by Formula (7) and Formula (8) as a hindered amine-based photostabilizer.

Meanwhile, the specific conditions for the accelerated weather resistance test are described in Examples.

As can be understood from such characteristic curves A and B, the $\Delta b^*$ value decreases as the content of the hindered amine-based photostabilizer increases.

Therefore, it is understood that as the content of the hindered amine-based photostabilizer increases, the effect of imparting weather resistance is increased.

More specifically, it is understood that as the content of the hindered amine-based photostabilizer increases from 0 parts by weight to 0.1 parts by weight, the $\Delta b^*$ value rapidly decreases. It is also understood that if the content of the hindered amine-based photostabilizer has a value of at least above 10 parts by weight, the effect of decreasing the $\Delta b^*$ value is saturated.

From this point of view, as described above, when it is considered that if the content of the hindered amine-based photostabilizer is excessively increased, transparency or durability in the resulting light diffusion film may excessively decrease, it is comprehended that the content of the hindered amine-based photostabilizer should be adjusted to a value within the range of 0.1 parts to 10 parts by weight.

Meanwhile, in regard to the characteristic curves A and B, a difference in the effect of adding a hindered amine-based photostabilizer can be seen; however, the fact that the light diffusion film has predetermined weather resistance by itself is essential per se.

It is because, for example, since a significant number of light diffusion films are used in the form of a laminate with a substrate or an adhesive layer, if the weather resistance of the light diffusion film alone is insufficient, weather resistance can be imparted to the substrate or adhesive layer laminated over the entire surface of the light diffusion film, and the weather resistance of the laminate as a whole can be supplemented.

However, if the light diffusion film itself lacks weather resistance, there occur various problems such as that there may be excessively strict limitations on the substrate or adhesive layer to be laminated, or the total film thickness of the laminate may become excessively large.

6. Other Additives

Furthermore, additives other than the compounds described above can be appropriately added to the extent that the effect of the present invention is not impaired.

Examples of such additives include an oxidation inhibitor, an ultraviolet absorber, an antistatic agent, a polymerization accelerator, a polymerization inhibitor, an infrared absorber, a plasticizer, a diluent solvent, a leveling agent, and the like.

Meanwhile, the content of these additives is preferably adjusted to a value within the range of 0.001 parts to 5 parts by weight, more preferably to a value within the range of 0.01 parts to 3 parts by weight, and even more preferably to a value within the range of 0.03 parts to 2 parts by weight, relative to the total amount, taken as 100 parts by weight, of the component (A) and the component (B).

Particularly, in regard to the ultraviolet absorber, when the composition for light diffusion film is irradiated with active energy radiation, the ultraviolet absorber may absorb ultraviolet radiation and thereby inhibits the formation of a predetermined internal structure. Therefore, it is preferable that the content of the ultraviolet absorber is adjusted to a value within the range of 0.001 parts or more but less than 2 parts by weight relative to the total amount, taken as 100 parts by weight, of the component (A) and the component (B).

Second Embodiment

A second embodiment of the present invention is a light diffusion film obtained by irradiating a composition for light diffusion film with active energy radiation, characterized in that the composition for light diffusion film includes a (meth)acrylic acid ester containing plural aromatic rings as component (A); a urethane (meth)acrylate as component (B); a photopolymerization initiator as component (C); and a hindered amine-based photostabilizer as component (D), the content of the component (A) is adjusted to a value within the range of 25 parts to 400 parts by weight relative to 100 parts by weight of the component (B), the content of the component (C) is adjusted to a value within the range of 0.2 parts to 20 parts by weight relative to the total amount, taken as 100 parts by weight, of the component (A) and the component (B), and the content of the component (D) is adjusted to a value within the range of 0.1 parts to 10 parts by weight relative to the total amount, taken as 100 parts by weight, of the component (A) and the component (B).

Hereinafter, the second embodiment of the present invention will be specifically explained, with reference to the drawings, mainly in view of the differences between the first embodiment and the second embodiment.

1. Internal Structure

The internal structure for the light diffusion film of the present invention is not particularly limited as long as the internal structure can cause light diffusion with incident angle dependency; however, the internal structure will be explained by taking a louver structure and a columnar structure as examples.

(1) Louver Structure

It is preferable that the light diffusion film of the present invention has, within the film, a louver structure in which plural plate-shaped regions having different refractive indices are alternately arranged along any one arbitrary direction along the film plane.

Hereinafter, the louver structure will be described specifically.

(1)-1 Refractive Index

In regard to the louver structure, it is preferable that the difference between the refractive index of plate-shaped regions having a relatively high refractive index and the refractive index of plate-shaped regions having a relatively low refractive index is adjusted to a value of 0.01 or more.

The reason for this is that when such a difference in the refractive index is adjusted to a value of 0.01 or more, +incident light can be stably reflected inside the louver structure, and thereby the incident angle dependency attributable to the louver structure can be further enhanced.

More specifically, it is because if such a difference in refractive index has a value of below 0.01, the angle range in which incident light is fully reflected inside the louver structure is narrowed, and therefore, incident angle dependency may be excessively lowered.

Therefore, it is more preferable that the difference in the refractive index between plate-shaped regions having different refractive indices in a louver structure is adjusted to a value of 0.05 or more, and even more preferably to a value of 0.1 or more.

Meanwhile, it is more preferable as the difference between the refractive index of high-refractive index plate-shaped regions and the refractive index of low-refractive index plate-shaped region is larger; however, from the viewpoint of selecting a material capable of forming a louver structure, it is assumed that a difference of about 0.3 is the upper limit.

(1)-2 Width

Figure 6A:
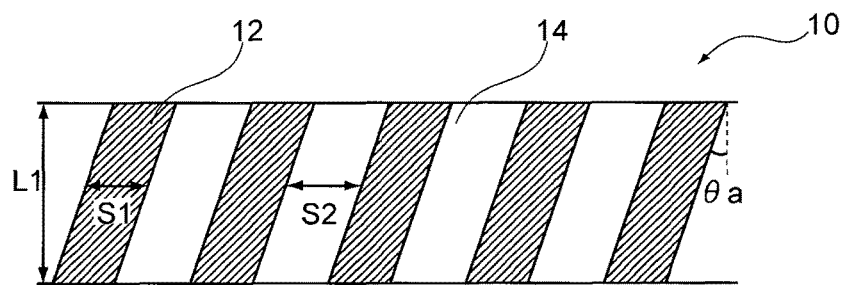
FIGS. 6(a) and 6(b) are diagrams provided in order to explain a louver structure.

Furthermore, as illustrated in FIG. 6(a), in regard to the louver structure, it is preferable to adjust each of the widths (S1, S2) of a high-refractive index plate-shaped region 12 and a low-refractive index plate-shaped region 14 having different refractive indices, to a value within the range of 0.1 to 15 μm.

The reason for this is that, when the width of such a plate-shaped region is adjusted to a value within the range of 0.1 to 15 μm, incident light can be reflected more stably inside the louver structure, and the incident angle dependency attributable to the louver structure can be enhanced more effectively.

That is, it is because if the width of such a plate-shaped region has a value of below 0.1 μm, it may be difficult to exhibit light diffusion regardless of the incident angle of incident light. On the other hand, it is because if such a width has a value of above 15 μm, the amount of light that propagates straight inside the louver structure increases, and uniformity of diffused light may be deteriorated.

Therefore, in regard to the louver structure, it is more preferable that each of the widths of the plate-shaped regions having different refractive indices is adjusted to a value within the range of 0.5 to 10 μm, and even more preferably to a value within the range of 1 to 5 μm.

Meanwhile, the width, length and the like of the plate-shaped regions constituting the louver structure can be measured by observing a cross-section of the film using an opto-digital microscope or the like.

(1)-3 Thickness

Figure 6B:
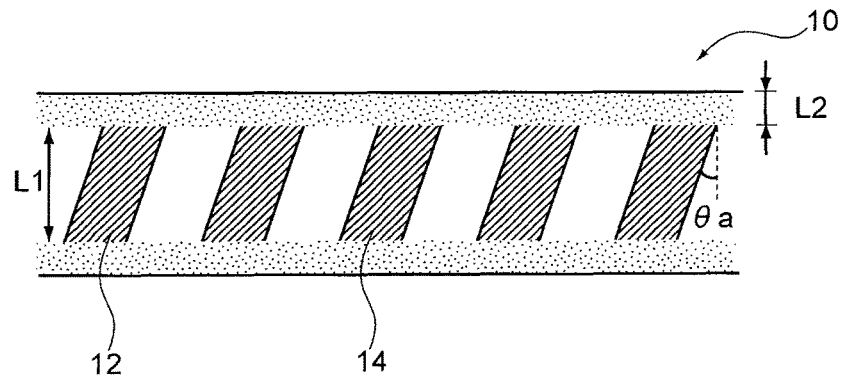

Furthermore, it is preferable that the thickness of the louver structure, that is, the length L1 of a plate-shaped region in the direction normal to the film plane as illustrated in FIGS. 6(a) and 6(b), is adjusted to a value within the range of 50 to 500 μm.

The reason for this is that when the thickness of the louver structure is adjusted to a value within such a range, the length of the plate-shaped region along the film thickness direction can be stably secured, incident light can be reflected more stably inside the louver structure, and uniformity of the intensity of diffused light in the light diffusion angle region originating from the louver structure can be further enhanced.

That is, it is because, if the thickness L1 of such a louver structure has a value of below 50 μm, the length of the plate-shaped region is insufficient, the amount of incident light that propagates straight inside the louver structure increases, and it may be difficult to obtain uniformity in the intensity of diffused light in the light diffusion angle region. On the other hand, it is because if the thickness L1 of such a louver structure has a value of above 500 μm, when a louver structure is formed by irradiating the composition for light diffusion film with active energy radiation, the direction of progress of photopolymerization is diffused by the louver structure formed in the beginning, and it may be difficult to form a desired louver structure.

Therefore, it is more preferable to set the thickness L1 of the louver structure to a value within the range of 70 to 300 and more preferably to a value within the range of 80 to 200 μm.

Furthermore, the light diffusion film of the present invention may have, as illustrated in FIG. 6(a), the louver structure (film thickness direction length L1) formed over the entirety of the film thickness direction, or as illustrated in FIG. 6(b), the light diffusion film may have a louver structure unformed part (film thickness direction length L2) in at least any one of the upper end and the lower end of the film.

(1)-4 Angle of Inclination

Furthermore, as illustrated in FIGS. 6(a) and 6(b), it is preferable that the high-refractive index plate-shaped regions 12 and the low-refractive index plate-shaped regions 14 are respectively arranged in parallel at a constant angle of inclination θa with respect to the film thickness direction.

The reason for this is that, by making the angle of inclination θa of the plate-shaped regions constant, incident light can be reflected more stably inside the louver structure, and the incident angle dependency attributable to the louver structure can be further enhanced.

Furthermore, it is preferable that the angle of inclination θa of the plate-shaped regions is adjusted to a value within the range of 0° to 80°.

The reason for this is that if such an angle of inclination θa has a value of above 80°, it may be difficult to manifest incident angle dependency.

Therefore, it is more preferable that the angle of inclination θa of the plate-shaped regions is adjusted to a value within the range of 0° to 50°.

Meanwhile, θa means the angle of inclination (°) of the plate-shaped regions in a case in which the angle of the normal line with respect to the film plane that is measured in a cross-section when the film is cut in a plane that is perpendicular to the louver structure extended in any one arbitrary direction along the film plane, is designated as 0°.

More specifically, as illustrated in FIGS. 6(a) and 6(b), the angle of inclination means the narrower angle between the angles formed by the normal line of the upper end surface of the louver structure and the top of the plate-shaped regions. Meanwhile, the angle of inclination in the case in which the plate-shaped regions are inclined to the right side as illustrated in FIGS. 6(a) and 6(b) is taken as the reference, and the angle of inclination in the case in which the plate-shaped regions are inclined to the left side is described with a minus sign.

(2) Columnar Structure

It is also preferable that the light diffusion film of the present invention has, within the film, a columnar structure in which plural pillar-shaped objects having a relatively high refractive index are arranged to stand close together in regions having a relatively low refractive index.

Hereinafter, the columnar structure will be explained specifically.

(2)-1 Refractive Index

In the columnar structure, it is preferable that the difference between the refractive index of the pillar-shaped objects having a relatively high refractive index and the refractive index of the regions having a relatively low refractive index is adjusted to a value of 0.01 or more, more preferably to a value of 0.05 or more, and even more preferably to a value of 0.1 or more.

Meanwhile, the details will not be repeated here since the matters are redundant with the contents of the section "Refractive index" in connection with the louver structure described above.

(2)-2 Maximum Diameter

Figure 7A:
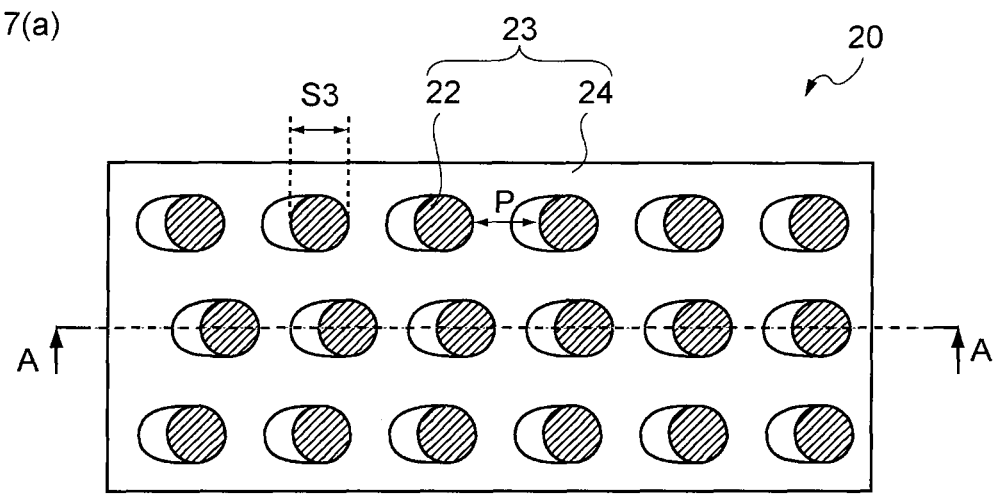
FIGS. 7(a) and 7(b) are diagrams provided in order to explain a columnar structure.

Furthermore, as illustrated in FIG. 7(a), in regard to the columnar structure, it is preferable that the maximum diameter S3 in a cross-section of the pillar-shaped object is adjusted to a value within the range of 0.1 to 15 μm, more preferably to a value within the range of 0.5 to 10 μm, and even more preferably to a value within the range of 1 to 5 μm.

Meanwhile, a cross-section of the pillar-shaped object means a cross-section cut by a plane that is parallel to the film plane.

Furthermore, there are no particular limitations on the cross-sectional shape of the pillar-shaped object; however, it is preferable to use, for example, a circular shape, an elliptical shape, a polygonal shape, or an irregular shape.

Meanwhile, the details will not be repeated here since the matters are redundant with the contents of the section "Width" in connection with the louver structure described above.

(2)-3 Distance Between Pillar-Shaped Objects

Furthermore, as illustrated in FIG. 7(a), in regard to the columnar structure, it is preferable that the distance between pillar-shaped objects, that is, the space P in adjacent pillar-shaped objects, is adjusted to a value within the range of 0.1 to 15 μm, more preferably to a value within the range of 0.5 to 10 μm, and even more preferably to a value within the range of 1 to 5 μm.

Meanwhile, the details will not be repeated here since the matters are redundant with the contents of the section "Refractive index" in connection with the louver structure described above.

(2)-4 Thickness

Figure 7B:
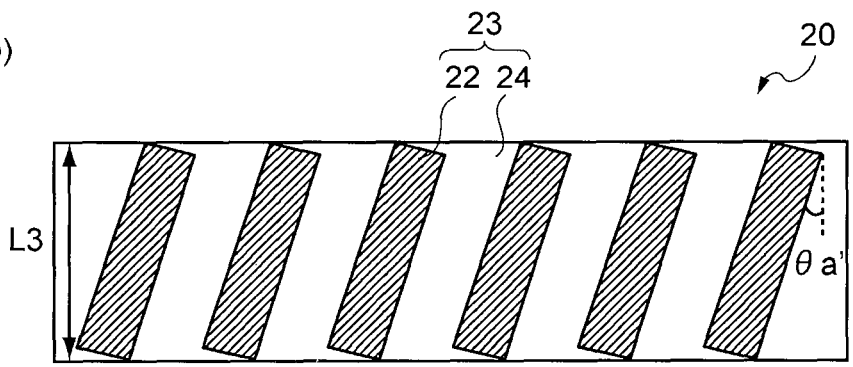

As illustrated in FIG. 7(b), it is preferable that the thickness of the columnar structure, that is, the length of a pillar-shaped object L3 is adjusted to a value within the range of 50 to 500 μm, more preferably to a value within the range of 70 to 300 μm, and even more preferably to a value within the range of 80 to 200 μm.

Meanwhile, the details will not be repeated here since the matters are redundant with the contents of the section "Thickness" in connection with the louver structure described above.

(2)-5 Angle of Inclination

As illustrated in FIG. 7(b), in regard to the columnar structure, it is preferable that the pillar-shaped objects 22 are arranged to stand close together at a constant angle of inclination of θa' with respect to the film thickness direction, and it is preferable to set the angle of inclination θa' to a value within the range of 0° to 80°, and more preferably to a value within the range of 0° to 50°.

Furthermore, θa' means the angle of inclination (°) of the pillar-shaped objects in a case in which the angle of the normal line with respect to the film plane that is measured in a cross-section when the film is cut by a plane which is a plane perpendicular to the film plane and cuts one pillar-shaped object as a whole into two along the axial line, is designated as 0° (the narrower angle between the angles formed by the normal line and the pillar-shaped object).

Meanwhile, the details will not be repeated here since the matters are redundant with the contents of the section "Angle of inclination" in connection with the louver structure described above.

2. Film Thickness

Furthermore, it is preferable that the film thickness of the light diffusion film of the present invention to a value within the range of 60 to 700 μm.

The reason for this is that, if the film thickness of the light diffusion film has a value of below 60 μm, the amount of incident light that propagates straight inside the predetermined internal structure increases, and it may be difficult to manifest light diffusion. On the other hand, it is because, if the film thickness of the light diffusion film has a value of above 700 μm, when the predetermined internal structure is formed by irradiating the composition for light diffusion film with active energy radiation, the direction of progress of photopolymerization is diffused by the internal structure formed in the beginning, and it may be difficult to form a desired internal structure.

Therefore, it is more preferable to set the film thickness of the light diffusion film to a value within the range of 90 to 450 μm, and even more preferably to a value within the range of 120 to 250 μm.

3. Weather Resistance

It is preferable for the light diffusion film of the present invention that the film thickness has a value of 170 μm or more, and also, the Δb* value, which is the difference between the b* values obtained before and after an accelerated weather resistance test of radiating light having a center wavelength of 388 nm under the conditions of 100 hours at an illuminance of 50 mW/cm$^2$ using a fadeometer equipped with a carbon arc lamp, has a value of 12 or less.

The reason for this is that when the light diffusion film has such characteristics, a light diffusion film having superior weather resistance can be obtained.

That is, the b* value is a value corresponding to a position between yellow color and blue color in the L*a*b* color space, such that as the b* value has a larger negative value, the color is closer to blue, and as the b* value has a larger positive value, the color is closer to yellow.

Therefore, under the presumption that the film thickness of the light diffusion film has a value greater than or equal to a predetermined value, the state of yellowing of the light diffusion film caused by an accelerated weather resistance test can be evaluated by defining the Δb* value, which is a value obtained by subtracting the initial b* value from the b* value obtained after the accelerated weather resistance test.

More specifically, it is because if such a value becomes a value larger than 12, a sufficient difference in the degree of yellowing is not recognized compared with the case of not adding a hindered amine-based photostabilizer, and sufficient weather resistance may not be exhibited.

Therefore, it is more preferable for the light diffusion film of the present invention that the film thickness has a value of 170 μm or more, and also, the Δb* value, which is the difference between the b* values obtained before and after an accelerated weather resistance test of radiating light having a center wavelength of 388 nm under the conditions of 100 hours at an illuminance of 50 mW/cm$^2$ using a fadeometer equipped with a carbon arc lamp, has a value of 9 or less, and even more preferably a value of 5 or less.

Meanwhile, it is preferable that the accelerated weather resistance test is carried out according to JIS B 7751.

4. Adhesive Layer

The light diffusion film of the present invention may also include, on one surface thereof or on both surfaces, an adhesive layer to be laminated onto an adherend.

The adhesive that constitutes such an adhesive layer is not particularly limited, and a conventionally known acrylic, silicone-based, urethane-based, rubber-based adhesives and the like can be used.

5. Production Method

Hereinafter, a method for producing the light diffusion film of the present invention will be explained; however, it is needless to say that the light diffusion film according to the present invention is not intended to be limited to the following production method.

(1) Step of Preparing Composition for Light Diffusion Film

This step is a step of preparing a predetermined composition for light diffusion film.

More specifically, it is a step of mixing the components (A) to (D) and other additives as desired.

In addition, on the occasion of mixing, the mixture may be stirred directly at room temperature; however, from the viewpoint of enhancing uniformity, it is preferable to produce a uniform mixed liquid by, for example, stirring the mixture under warmed conditions at 40° C. to 80° C.

It is also preferable to further add a diluent solvent so as to obtain a desired viscosity appropriate for coating.

Meanwhile, since the composition for light diffusion film has been explained in the first embodiment, further explanation will not be repeated here.

(2) Application Step

Figure 8A:
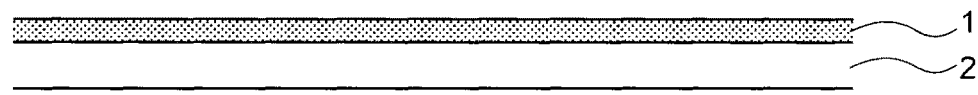
FIGS. 8(a) to 8(c) are diagrams provided in order to explain various steps in the method for producing a light diffusion film.

Such a step is, as illustrated in FIG. 8(a), a step of applying the composition for light diffusion film on a process sheet 2 and forming a coating layer 1.

Regarding the process sheet, a plastic film and paper can all be used.

Among these, examples of plastic films include polyester-based films such as a polyethylene terephthalate film; polyolefin-based films such as a polyethylene film and a polypropylene film, cellulose-based films such as a triacetyl cellulose film, polyimide-based films, and the like.

Furthermore, examples of paper include glassine paper, coated paper, and laminate paper.

Furthermore, in consideration of the steps that will be described below, it is preferable that the process sheet 2 is a plastic film having excellent dimensional stability against heat or active energy radiation.

Preferred examples of such film include, among those described above, a polyester-based film, a polyolefin-based film, and a polyimide-based film.

Furthermore, in the process sheet, it is preferable to provide a release layer on the side of the surface coated with the composition for light diffusion film in the process sheet, in order to facilitate peeling of the light diffusion film obtained after photocuring from the process sheet.

Such a release layer can be formed using a conventionally known release agent such as a silicone-based release agent, a fluorine-based release agent, an alkyd-based release agent, an olefin-based release agent or the like.

Meanwhile, usually, the thickness of the process sheet is preferably adjusted to a value within the range of 25 to 200 μm.

Furthermore, the method of applying a composition for light diffusion film on a process sheet can be carried out by, for example, a conventionally known method such as a knife coating method, a roll coating method, a bar coating method, a blade coating method, a die coating method, or a gravure coating method.

Meanwhile, in this case, it is preferable to set the film thickness of the coating layer to a value within the range of 80 to 700 μm.

(3) Active Energy Ray Irradiation Step

Figure 8B:
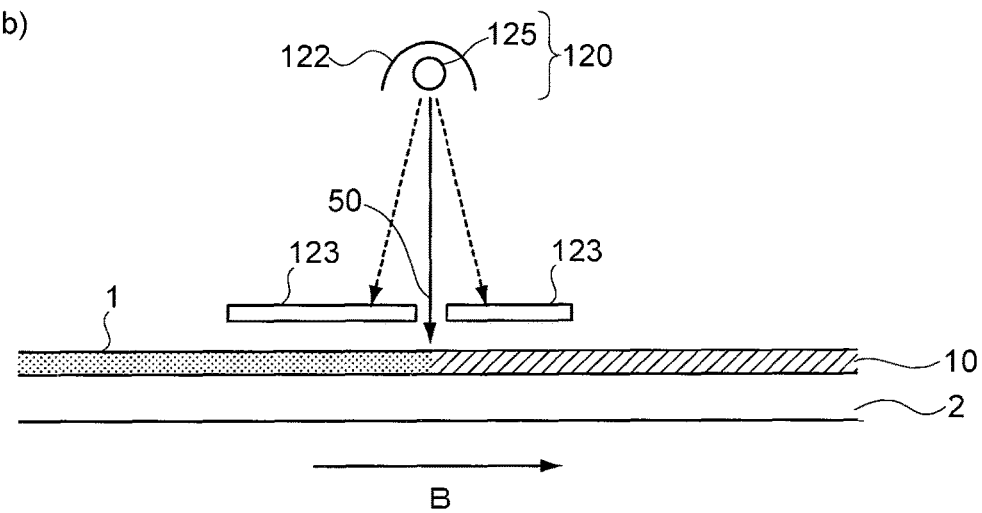
Figure 8C:
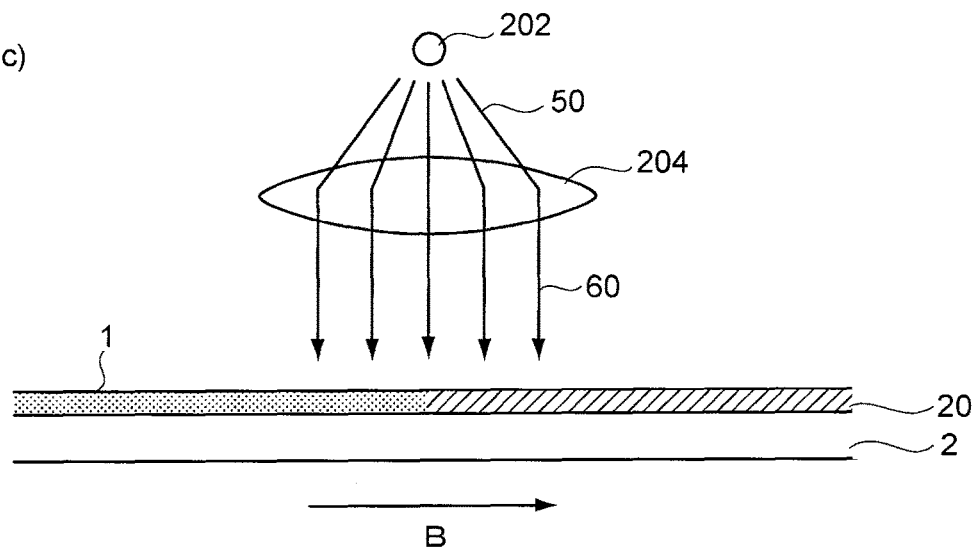

Such a step is, as illustrated in FIGS. 8(b) and 8(c), a step of irradiating the coating layer 1 with active energy radiation, forming a predetermined internal structure such as a louver structure or a columnar structure, and forming a light diffusion film.

Hereinafter, the active energy ray irradiation step will be explained separately for the case of forming a louver structure and the case of forming a columnar structure.

(3)-1 Case of Forming Louver Structure

In the case of forming a louver structure, as illustrated in FIG. 8(b), the coating layer 1 formed on the process sheet 2 is irradiated with active energy radiation 50, which is composed only of direct light at a controlled angle of irradiation.

Figure 9A:
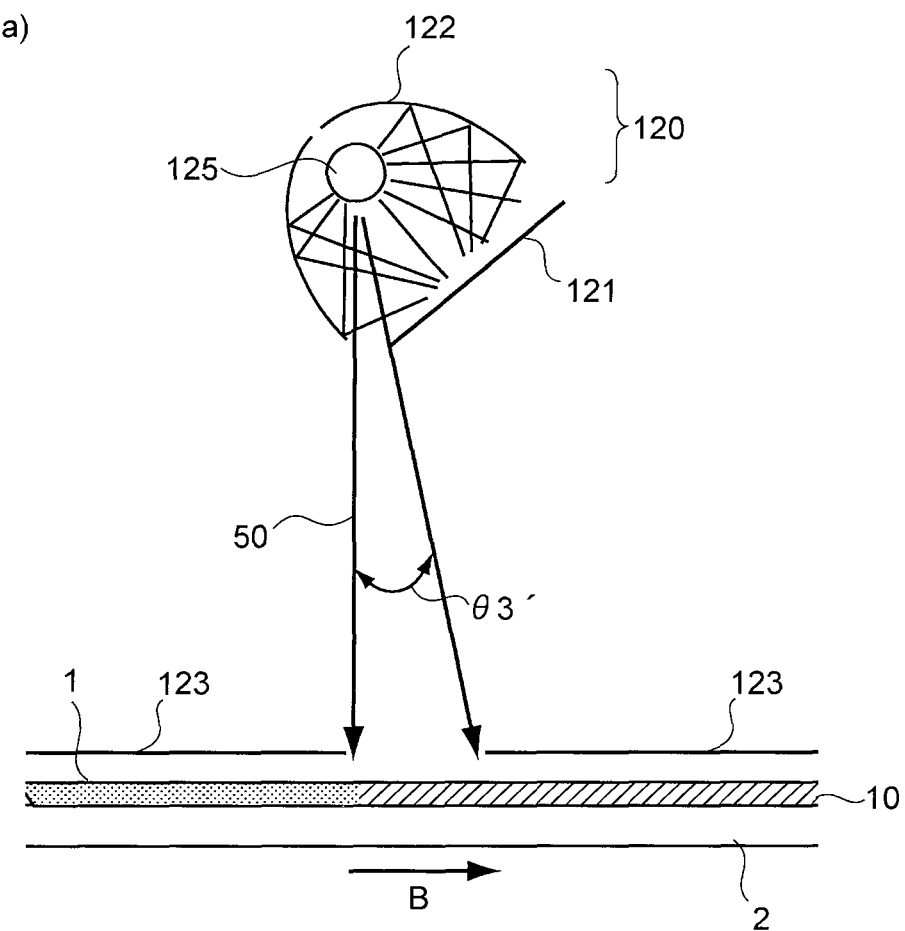
FIGS. 9(a) and 9(b) are diagrams provided in order to explain an active energy ray irradiation step.

More specifically, for example, as illustrated in FIG. 9(a), a light blocking plate 121 and a light blocking plate 123 are arranged in an ultraviolet irradiating apparatus 120 (for example, if a commercially available product is to be used, ECS-4011GX manufactured by Eye Graphics Co., Ltd., or the like) in which a cold mirror 122 for light collection is provided on a linear ultraviolet lamp 125, thereby active energy radiation 50 composed only of direct light at a controlled angle of irradiation is extracted, and the coating layer 1 formed on the process sheet 2 is irradiated with the active energy radiation.

Meanwhile, the linear ultraviolet lamp is installed such that the angle usually has a value within the range of −80° to 80°, preferably a value within the range of −50° to 50°, and particularly preferably a value within the range of −30° to 30°, with respect to a direction perpendicular to the longitudinal direction of the process sheet 2 having the coating layer 1, as the reference (0°).

Here, a linear light source is used because a louver structure in which plate-shaped regions having different refractive indices are arranged alternately and in parallel at a constant angle of inclination with respect to the film thickness direction, can be produced efficiently and stably.

More specifically, when a linear light source is used, a light that is substantially parallel when viewed from the axial direction of the linear light source, and is non-parallel when viewed from a direction perpendicular to the axial direction of the linear light source, can be radiated.

Figure 9B:
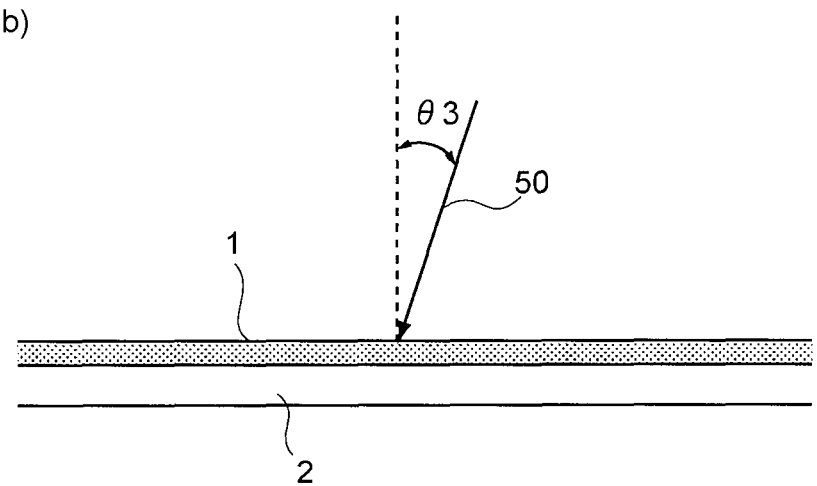

At this time, regarding the angle of irradiation of the irradiated light, as illustrated in FIG. 9(b), it is preferable that the angle of irradiation θ3 in the case in which the angle with respect to the normal line of the surface of the coating layer 1 is designated as 0°, is adjusted to a value within the range of −80° to 80°.

The reason for this is that, when the angle of irradiation has a value within the range of −80° to 80°, the influence of reflection at the surface of the coating layer 1 or the like is increased, and it may be difficult to form a sufficient louver structure.

Furthermore, it is preferable that the angle of irradiation θ3 has a width (width of angle of irradiation) θ3' of 1° to 80°.

The reason for this is that if such a width of angle of irradiation θ3' has a value of below 1°, the interval of the louver structure becomes too narrow, and it may be difficult to obtain a desired louver structure. On the other hand, it is because if such a width of angle of irradiation θ3' has a value of above 80°, the irradiated light is dispersed excessively, and it may be difficult to form a louver structure.

Therefore, it is more preferable that the width of the angle of irradiation θ3' of the angle of irradiation is adjusted to a value within the range of 2° to 45°, and even more preferably to a value within the range of 5° to 20°.

Furthermore, examples of the irradiated light include ultraviolet radiation and an electron beam; however, it is preferable to use ultraviolet radiation.

The reason for this is that, in the case of an electron beam, since the polymerization rate is so fast, the component (A) and the component (B) may not undergo sufficient phase separation during the process of polymerization, and it may be difficult to form a louver structure. On the other hand, it is because when compared with visible light or the like, ultraviolet radiation is associated with a wide variety of ultraviolet-curable resins that are cured by irradiation of ultraviolet radiation, or a wide variety of photopolymerization initiators that can be used, and therefore, the widths of selection of the component (A) and the component (B) can be broadened.

Furthermore, regarding the conditions for irradiation of ultraviolet radiation, it is preferable that the peak illuminance is adjusted to a value within the range of 0.1 to 50 mW/cm$^2$, and the irradiation is carried out so as to obtain a cumulative amount of light that allows sufficient curing of the coating layer.

Meanwhile, it is also preferable that ultraviolet radiation is irradiated in multiple stages so as to obtain a cumulative amount of light that allows sufficient curing of the coating layer.

Furthermore, it is preferable to pass the coating layer formed on the process sheet through the ultraviolet irradiating portion of an ultraviolet irradiating apparatus by moving the coating layer at a speed of 0.1 to 10 m/min.

The reason for this is that if such a speed has a value of below 0.1 m/min, mass productivity may be excessively decreased. On the other hand, if such a speed has a value of above 10 m/min, the speed is faster than the speed of curing of the coating layer, in other words, the formation of a louver structure, and the incident angle of ultraviolet radiation with respect to the coating layer varies significantly with the film thickness direction, so that the formation of the louver structure may occur insufficiently.

Therefore, it is more preferable to pass the coating layer formed on the substrate through an ultraviolet irradiating portion of an ultraviolet irradiating apparatus by moving the coating layer at a speed within the range of 0.2 to 5 m/min, and even more preferably to pass the coating layer at a speed within the range of 0.5 to 3 m/min.

Meanwhile, a light diffusion film obtained after the photocuring step is finally in a state of being usable by detaching the process sheet.

(3)-2 Case of Forming Columnar Structure

In the case of forming a columnar structure, as illustrated in FIG. 8(c), parallel light having a high degree of parallelization of light is irradiated to the coating layer 1 formed on the process sheet.

Here, parallel light means an approximately parallel light for which the direction of emitted light does not spread even when viewed from any direction.

Figure 10A:
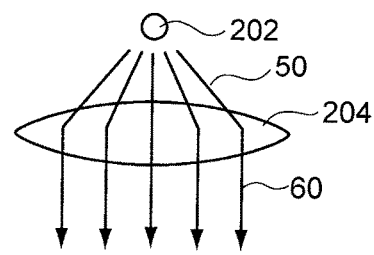
FIGS. 10(a) to 10(d) are other diagrams provided in order to explain the active energy ray irradiation step.
Figure 10B:
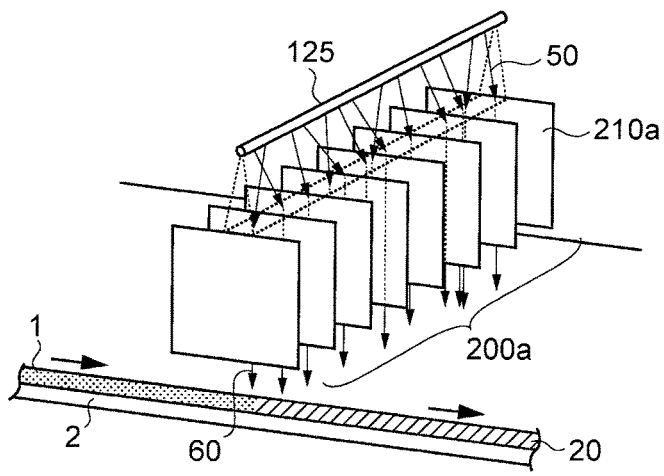
Figure 10C:
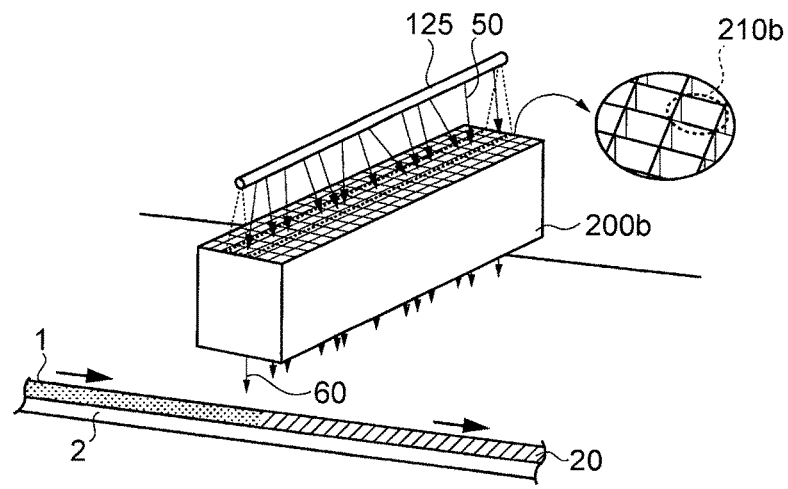

More specifically, for example, as illustrated in FIG. 10(a), it is preferable that light 50 from a point light source 202 is converted to parallel light 60 by a lens 204, and then is irradiated to the coating layer; or as illustrated in FIGS. 10(b) and 10(c), it is preferable to convert irradiated light 50 from a linear light source 125 to parallel light 60 by means of irradiated light parallelizing members 200 (200a and 200b), and then irradiate the parallel light to the coating layer, or the like.

Figure 10D:
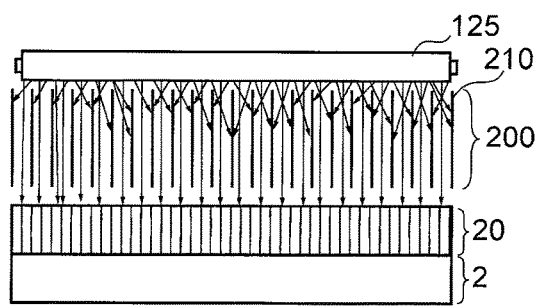

Meanwhile, as illustrated in FIG. 10(d), the irradiated light parallelizing members 200 can convert direct light emitted by a linear light source 125 to parallel light, by unifying the direction of light using, for example, light blocking members 210 such as plate-shaped members 210a or cylindrical members 210b, in a direction parallel to the axial line direction of the linear light source 125 whose direction of light is random, among the direct light emitted by the linear light source 125.

More specifically, among the direct light emitted by the linear light source 125, light with low parallelism with respect to the light blocking members 210 such as plate-shaped members 210a or cylindrical members 210b, is brought into contact with these light blocking members and is absorbed.

Therefore, only light with high parallelism, that is, parallel light, with respect to the light blocking members 210 such as plate-shaped members 210a or cylindrical members 210b can pass through the irradiated light parallelizing members 200, and as a result, the direct light emitted by the linear light source 125 is converted to parallel light by the irradiated light parallelizing members 200.

Meanwhile, the material for the light blocking members 210 such as plate-shaped members 210a or cylindrical members 210b is not particularly limited as long as the material can absorb light with low parallelism with respect to the light blocking members 210, and for example, a heat resistant black-painted ulster steel sheet can be used.

It is also preferable that the parallelism of the irradiated light is adjusted to a value of 10° or less.

The reason for this is that when the parallelism of the irradiated light is adjusted to a value within such a range, a columnar structure in which plural pillar-shaped objects are arranged to stand close together at a constant angle of inclination with respect to the film thickness direction, can be formed efficiently and stably.

Therefore, it is more preferable to adjust the parallelism of the irradiated light to a value of 5° or less, and even more preferably to a value of 2° or less.

Meanwhile, in regard to other conditions for irradiation, the details will not be repeated here since the conditions are equivalent to the conditions for the "Case of forming louver structure" described above.

EXAMPLES

Hereinafter, the present invention will be described in more detail by way of Examples.

Example 1

1. Synthesis of Component (B) Low-Refractive Index Polymerizable Compound

In a container, 2 moles of isophorone diisocyanate (IPDI) as a component (B1) and 2 moles of 2-hydroxyethyl methacrylate (HEMA) as a component (B3) were introduced with respect to 1 mole of polypropylene glycol (PPG) having a weight average molecular weight of 9,200 as a component (B2), and then the compounds were reacted according to a conventional method. Thus, a polyether urethane methacrylate having a weight average molecular weight of 9,900 was obtained.

Meanwhile, the weight average molecular weights of polypropylene glycol and polyether urethane methacrylate are values calculated relative to polystyrene standards measured by gel permeation chromatography (GPC) under the following conditions:

GPC analyzer: manufactured by Tosoh Corp., HLC-8020
GPC column: manufactured by Tosoh Corp. (hereinafter, described in order of passage)
TSK GUARD COLUMN HXL-H
TSK GEL GMHXL (×2)
TSK GEL G2000HXL
Measurement solvent: Tetrahydrofuran
Measurement temperature: 40° C.

2. Preparation of Composition for Light Diffusion Film

Next, a composition for light diffusion film was obtained by mixing 100 parts by weight of a polyether urethane methacrylate having a weight average molecular weight of 9,900 as the component (B) thus obtained, with 150 parts by weight of o-phenylphenoxy ethoxyethyl acrylate having a molecular weight of 268 represented by the following Formula (4) (manufactured by Shin Nakamura Chemical Co., Ltd., NK ESTER A-LEN-10) as component (A), 0.75 parts by weight (0.3 parts by weight relative to the total amount, taken as 100 parts by weight, of the component (A) and the component (B)) of a hindered amine-based photostabilizer represented by the following Formula (6) (manufactured by BASF SE, TINUVIN 123) as component (D), and 20 parts by weight (8 parts by weight relative to the total amount (100 parts by weight) of the component (A) and the component (B)) of 2-hydroxy-2-methyl-1-phonylpropan-1-one as component (C), and then heating and mixing the mixture under the conditions of 80° C.

Meanwhile, the refractive indices of the component (A) and the component (B) were measured according to JIS K0062 using an Abbe refractometer (manufactured by Atago Co., Ltd., Abbe refractometer DR-M2, Na light source, wavelength 589 nm), and the refractive indices were 1.58 and 1.46, respectively.

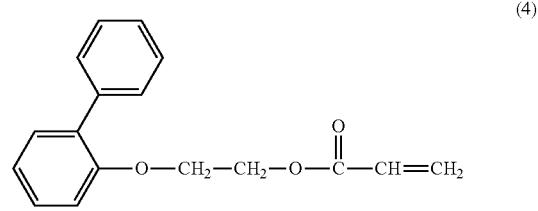

(4)

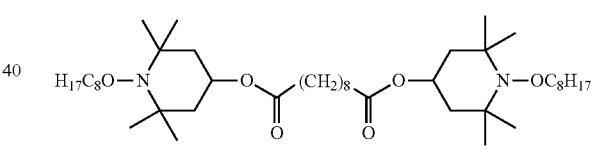

(6)

3. Application Step

Next, the composition for light diffusion film thus obtained was applied on a film-like transparent polyethylene terephthalate (hereinafter, referred to as PET) as a process sheet, and thus a coating layer having a film thickness of 175 μm was formed.

4. Active Energy Ray Irradiation

Next, an ultraviolet irradiating apparatus (manufactured by Eye Graphics Co., Ltd., ECS-4011GX) in which a linear high pressure mercury lamp is provided with a cold mirror for light collection as illustrated in FIG. 9(a), was prepared.

Next, a light blocking plate was installed on a heat wire cut-off filter frame, and the ultraviolet radiation irradiated to the surface of the coating layer was set up such that when the normal line of the coating layer surface when viewed from the major axis direction of the linear light source was designated as 0°, the angle of irradiation of direct ultraviolet radiation from the linear light source (θ3 in FIG. 9(b)) would be 2°.

At this time, the height from the coating layer surface to the linear light source was set to 500 mm, the peak illuminance was set to 2.0 mW/cm², and the cumulative amount of light was set to 50 mJ/cm².

Furthermore, in order to prevent the light reflected at the light blocking plate or the like, from becoming stray light inside the irradiator and affecting the photocuring of the coating layer, a light blocking plate was also provided near the conveyor, and the apparatus was set up such that only the ultraviolet radiation emitted directly from the linear light source would be irradiated to the coating layer.

Subsequently, the coating layer was irradiated with ultraviolet radiation while the coating layer was moved by a conveyor toward the right side as in FIG. 9(a) at a speed of 0.2 m/min.

Next, in order to promote reliable curing, an ultraviolet-transmissible peeling film having a thickness of 38 μm (manufactured by Lintec Corp., SP-PET 382050; center average roughness at the surface on the side irradiated with ultraviolet radiation: 0.01 μm, haze value: 1.80%, image definition: 425, transmittance for a wavelength of 360 nm: 84.3%) was laminated on the exposed surface side of the coating layer.

Subsequently, the laminate was irradiated with scattered light from the top of the peeling film at a peak illuminance of 10 mW/cm$^2$ and a cumulative amount of light of 150 mJ/cm$^2$ to completely cure the coating layer, and thus a light diffusion film having a film thickness of 175 μm was obtained.

Meanwhile, the peak illuminance and the cumulative amount of light were measured by installing a UV METER (manufactured by Eye Graphics Co., Ltd., EYE ultraviolet cumulative illuminometer UVPF-A1) equipped with a light receiver at the position of the coating layer.

Furthermore, the film thickness of the light diffusion film thus obtained was measured using a constant pressure thickness meter (manufactured by Takara Co., Ltd., TECLOCK PG-02J).

Figure 11:
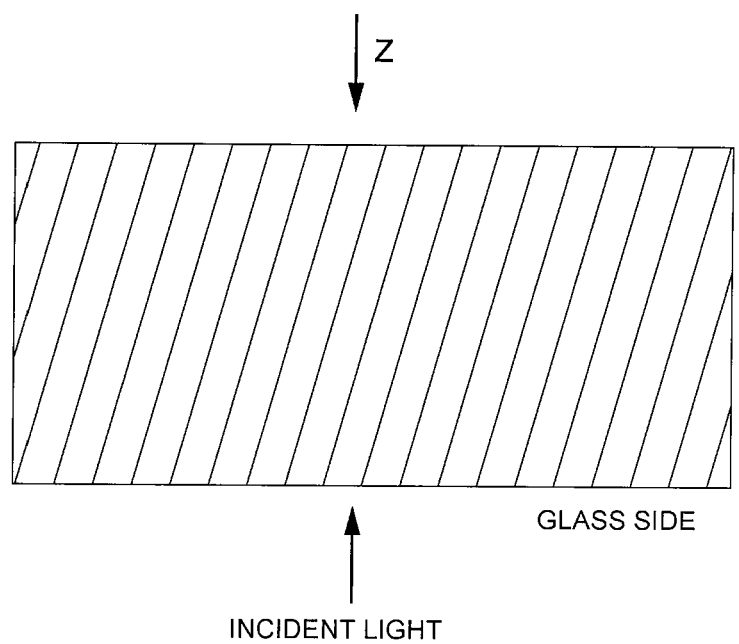
FIG. 11 is a diagram provided in order to illustrate a cross-section of a light diffusion film.

Furthermore, a schematic diagram of a cross-section obtained by cutting the light diffusion film thus obtained at a plane that is parallel to the traveling direction of the coating layer and is perpendicular to the film plane, is shown in FIG. 11.

As illustrated in FIG. 11 as such, it was confirmed that a well-defined louver structure was formed in the film.

Meanwhile, cutting of the light diffusion film was performed using a razor, and observation of the cross-section was carried out using an optical microscope (reflective observation).

5. Evaluation of Weather Resistance 1

Weather resistance of the light diffusion film thus obtained was evaluated.

That is, an adhesive layer was provided on the PET surface of the light diffusion film obtained in a state of being sandwiched between PET and a peeling film, and the adhesive layer was adhered to a soda glass plate having a thickness of 1.1 mm. Thus, a specimen for evaluation was obtained.

Subsequently, the initial color (Y value, x value, and y value as parameters constituting the CIEXYZ colorimetric system, and L* value, a* value, and b* value as parameters of the three axes constituting the CIE 1976 (L*a*b*) color space of the specimen thus obtained) was measured from the peeling film side of the specimen thus obtained, using a spectrophotometer (manufactured by Shimadzu Corp., UV-3600).

Subsequently, an accelerated weather resistance test was carried out by irradiating the specimen through the peeling film side with light having a center wavelength of 388 nm at an illuminance of 50 mW/cm$^2$ under the conditions of 100 hours according to JIS B 7751 using a fadeometer (manufactured by Suga Test Instruments Co., Ltd., U48) equipped with a carbon arc lamp, and thereafter, the color after the accelerated weather resistance test was measured in the same manner as in the measurement of the initial color. The results thus obtained are presented in Table 1.

Meanwhile, the determination of weather resistance in Table 1 was carried out according to the following criteria. Furthermore, the Δb* value is a numerical value based on the b* value as a parameter of one of the three axes constituting the CIE 1976 (L*a*b*) color space described above, and is a value obtained by subtracting the initial b* value from the b* value obtained after an accelerated weather resistance test.

Very good (=VG): The Δb* value has a value of below 3.

Good (=G): The Δb* value has a value of 3 or more but less than 9.

Fair (=F): The Δb* value has a value of 9 or more but less than 12.

Bad (=B): The Δb* value has a value of 12 or more.

A photograph of the specimen after an accelerated weather resistance test is presented in FIG. 12(b).

Meanwhile, FIG. 12(a) shows a photograph of a specimen obtained after an accelerated weather resistance test in Comparative Example 1 (amount of addition of the component (D): 0 parts by weight) that will be described below; FIG. 12(c) shows a photograph of a specimen obtained after an accelerated weather resistance test in below-described Example 2 (amount of addition of the component (D) relative to the total amount (100 parts by weight) of the component (A) and the component (B): 1 part by weight); FIG. 12(d) shows a photograph of a specimen after an accelerated weather resistance test in below-described Example 3 (amount of addition of the component (D) relative to the total amount (100 parts by weight) of the component (A) and the component (B): 2 parts by weight); and FIG. 12(e) shows a photograph of a specimen obtained after an accelerated weather resistance test in below-described Example 4 (amount of addition of the component (D) relative to the total amount (100 parts by weight) of the component (A) and the component (B): 5 parts by weight).

From such FIGS. 12(a) to 12(e), it is understood that as the amount of addition of the component (D) relative to the total amount (100 parts by weight) of the component (A) and the component (B) increases from 0 parts by weight to 5 parts by weight, the degree of yellowing decreases, and weather resistance is enhanced.

6. Evaluation of Weather Resistance 2

Furthermore, weather resistance of each of the components constituting the composition for light diffusion film was evaluated as follows.

(1) Evaluation of Component (A) and Component (C)

A composition for weather resistance evaluation (A1) was obtained by adding 2 parts by weight of the component (C) (photopolymerization initiator) to 100 parts by weight of the component (A) used when the composition for light diffusion film was prepared, and then heating and mixing the mixture under the conditions of 80° C.

Subsequently, the composition for weather resistance evaluation (A1) thus obtained was applied on a process sheet in the same manner as in Example 1 described above, and then was irradiated with active energy radiation. Thus, a film for weather resistance evaluation (A1) having a film thickness of 175 μm was obtained.

Furthermore, a film for weather resistance evaluation (A2) and a film for weather resistance evaluation (A3) were obtained in the same manner as in the case of the film for weather resistance evaluation (A1), except that the amount of addition of the component (C) was changed to 5 parts by weight and 8 parts by weight, respectively.

Subsequently, similarly to the evaluation of weather resistance 1, an adhesive layer was provided on the PET surface of each of the films for weather resistance evaluation (A1) to (A3) obtained in a state of being sandwiched between PET and the peeling film, and the adhesive layer was adhered to a soda glass plate having a thickness of 1.1 mm. Thus, specimens for evaluation were obtained.

Subsequently, similarly to the evaluation of weather resistance 1, the initial light transmittances (%) for various wavelengths were measured from the peeling film side of the specimens thus obtained, using a spectrophotometer (manufactured by Shimadzu Corp., UV-3600).

Subsequently, similarly to the evaluation of weather resistance 1, an accelerated weather resistance test was carried out by irradiating the specimens with light having a center wavelength of 388 nm through the peeling film side of the specimen using a fadeometer (manufactured by Suga Test Instruments Co., Ltd., U48) at an illuminance of 50 mW/cm$^2$ for 100 hours, and thereafter, light transmittances (%) for various wavelengths (nm) after the accelerated weather resistance test were measured in the same manner as in the measurement of the initial light transmittances. Wavelength-light transmittance charts thus obtained are presented in FIGS. 13(a) to 13(c).

Figure 13A:
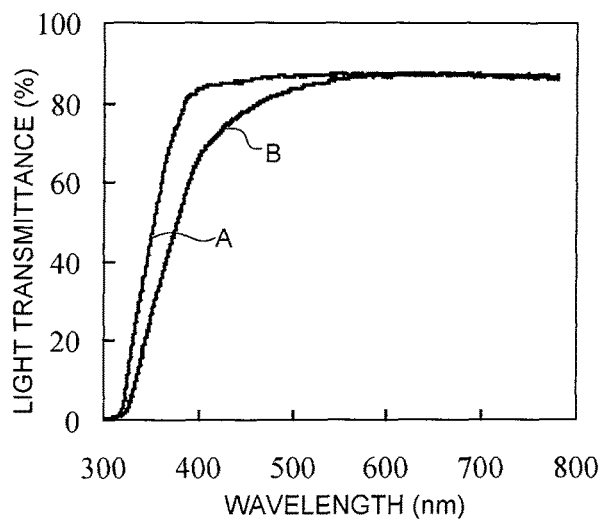
FIGS. 13(a) to 13(c) are diagrams provided in order to show weather resistance of each of the components constituting the composition for light diffusion film.
Figure 13B:
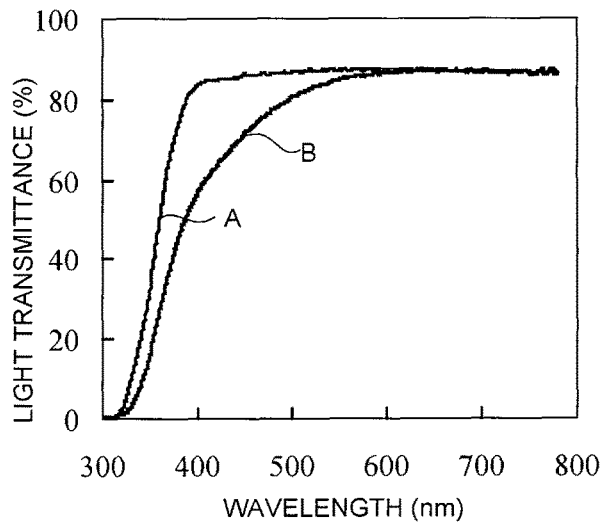
Figure 13C:
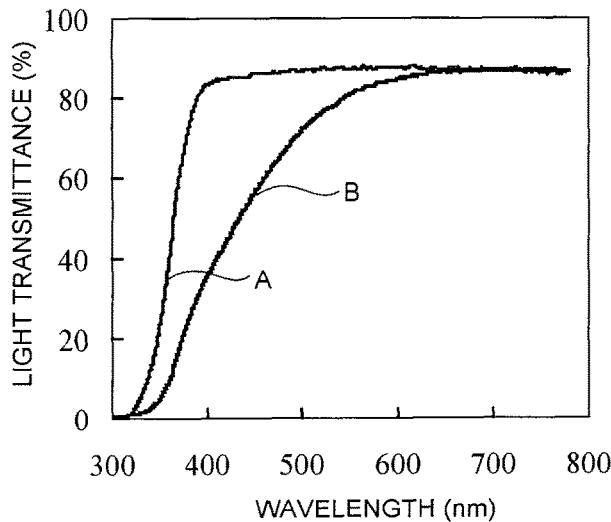

Meanwhile, FIG. 13(a) is a wavelength-light transmittance chart for the film for weather resistance evaluation (A1); FIG. 13(b) is a wavelength-light transmittance chart for the film for weather resistance (A2); and FIG. 13(c) is a wavelength-light transmittance chart for the film for weather resistance evaluation (A3).

Furthermore, the characteristic curve A in each of the wavelength-light transmittance charts is a wavelength-light transmittance chart obtained initially, and the characteristic curve B is a wavelength-light transmittance chart obtained after an accelerated weather resistance test.

From these wavelength-light transmittance charts, it is understood that there is a tendency that as the amount of addition of the component (C) increases, the light transmittance for light having a wavelength of 300 to 600 nm in the film for weather resistance evaluation decreases.

Therefore, it is understood that, among the components that constitute the composition for light diffusion film, the combination of at least the component (A) and the component (C) contributes to a decrease in light resistance, and also to yellowing of the film, and particularly the influence of the component (C) is significant.

(2) Evaluation of Component (B) and Component (C)

A composition for weather resistance evaluation (B1) was obtained by adding 2 parts by weight of the component (C) to 100 parts by weight of the component (B) used when the composition for light diffusion film was prepared, and then heating and mixing the mixture under the conditions of 80° C.

Subsequently, the composition for weather resistance evaluation (B1) thus obtained was applied on a process sheet in the same manner as in Example 1 described above, and then the composition was irradiated with active energy radiation. Thus, a film for weather resistance evaluation (B1) having a film thickness of 175 μm was obtained.

Furthermore, a film for weather resistance evaluation (B2) and a film for weather resistance evaluation (B3) were obtained in the same manner as in the case of the film for weather resistance evaluation (B1), except that the amount of addition of the component (C) was changed to 5 parts by weight and 8 parts by weight, respectively.

Subsequently, the light transmittances (%) for various wavelengths in the beginning and after an accelerated weather resistance test for the films for weather resistance evaluation (B1) to (B3) thus obtained were measured in the same manner as in the "Evaluation of component (A) and component (C)" described above. The wavelength-light transmittance charts thus obtained are presented in FIGS. 14(a) to 14(c).

Figure 14A:
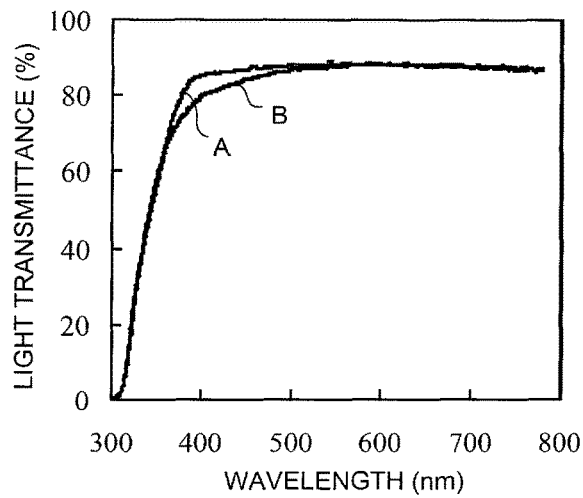
FIGS. 14(a) to 14(c) are other diagrams provided in order to show weather resistance of each of the components constituting the composition for light diffusion film.
Figure 14B:
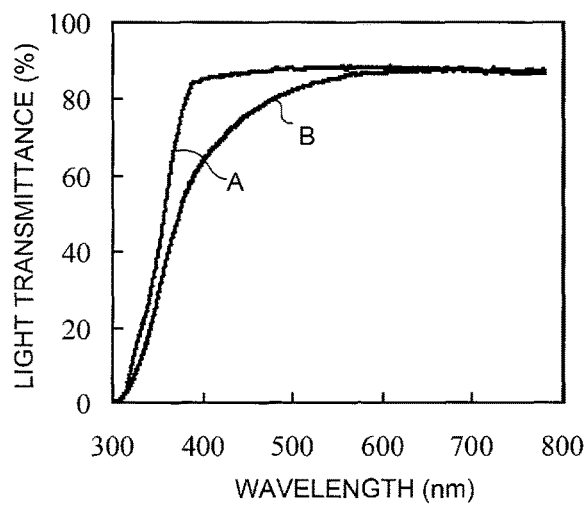
Figure 14C:
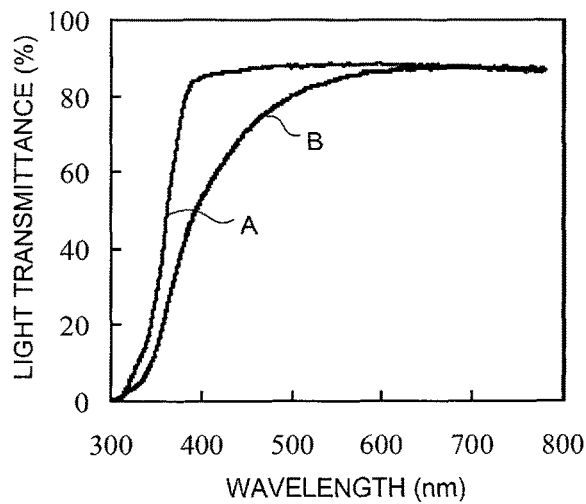

Meanwhile, FIG. 14(a) is a wavelength-light transmittance chart for the film for weather resistance evaluation (B1); FIG. 14(b) is a wavelength-light transmittance chart for the film for weather resistance evaluation (B2); and FIG. 14(c) is a wavelength-light transmittance chart for the film for weather resistance evaluation (B3).

Furthermore, the characteristic curve A in each of the wavelength-light transmittance charts is a wavelength-light transmittance chart obtained initially, and the characteristic curve B is a wavelength-light transmittance chart obtained after an accelerated weather resistance test.

From these wavelength-light transmittance charts, it is understood that there is a tendency that as the amount of addition of the component (C) increases, the light transmittance for light having a wavelength of 300 to 600 nm in the film for weather resistance evaluation decreases.

Therefore, it is understood that, among the components that constitute the composition for light diffusion film, the combination of at least the component (B) and the component (C) also contributes to a decrease in weather resistance, and also to yellowing of the film, and particularly the influence of the component (C) is significant.

Furthermore, when FIGS. 13(a) to 13(c) and FIGS. 14(a) to 14(c) are compared, it is understood that since the extent of the decrease in light transmittance for light having a wavelength of 300 to 600 nm in the case of adding the same amount of the component (C) is larger in FIGS. 13(a) to 13(c), the component (A) affects the decrease in weather resistance and yellowing of the film more than the component (B).

Example 2

In Example 2, a light diffusion film was produced in the same manner as in Example 1, except that when the composition for light diffusion film was prepared, the amount of addition of the component (D) was changed to 2.5 parts by weight (1 part by weight relative to the total amount (100 parts by weight) of the component (A) and the component (B)), and the film was evaluated. The results thus obtained are presented in Table 1 and FIG. 12(c).

Meanwhile, FIG. 12(c) shows a photograph of the specimen after an accelerated weather resistance test for the light diffusion film of Example 2.

Example 3

In Example 3, a light diffusion film was produced in the same manner as in Example 1, except that when the composition for light diffusion film was prepared, the amount of addition of the component (D) was changed to 5 parts by weight (2 parts by weight relative to the total amount (100 parts by weight) of the component (A) and the component (B)), and the film was evaluated. The results thus obtained are presented in Table 1 and FIG. 12(d).

Meanwhile, FIG. 12(d) shows a photograph of the specimen after an accelerated weather resistance test for the light diffusion film of Example 3.

Example 4

In Example 4, a light diffusion film was produced in the same manner as in Example 1, except that when the composition for light diffusion film was prepared, the amount of addition of the component (D) was changed to 12.5 parts by weight (5 parts by weight relative to the total amount (100 parts by weight) of the component (A) and the component (B)), and the film was evaluated. The results thus obtained are presented in Table 1 and FIG. 12(e).

Meanwhile, FIG. 12(e) shows a photograph of the specimen after an accelerated weather resistance test for the light diffusion film of Example 4.

Figure 15:
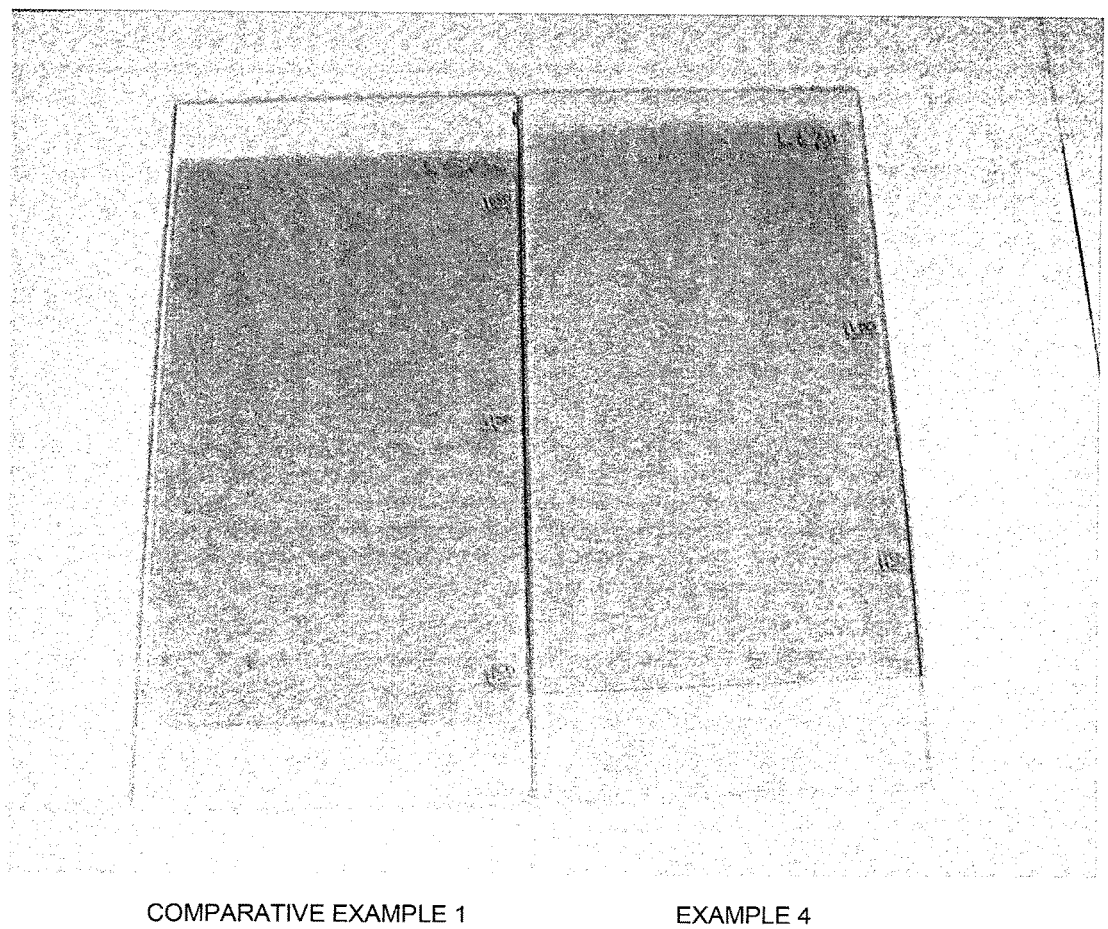
FIG. 15 is a photograph provided in order to make comparison of weather resistance of the light diffusion films of Example 4 and Comparative Example 1.

Furthermore, FIG. 15 shows a photograph in which the specimen after an accelerated weather resistance test (left side) in Comparative Example 1 (amount of addition of the component (D): 0 parts by weight) that will be described below, and the specimen after an accelerated weather resistance test (right side) in Example 4 (amount of addition of the component (D) relative to the total amount (100 parts by weight) of the component (A) and the component (B): 5 parts by weight) are arranged for a comparison.

Figure 16:
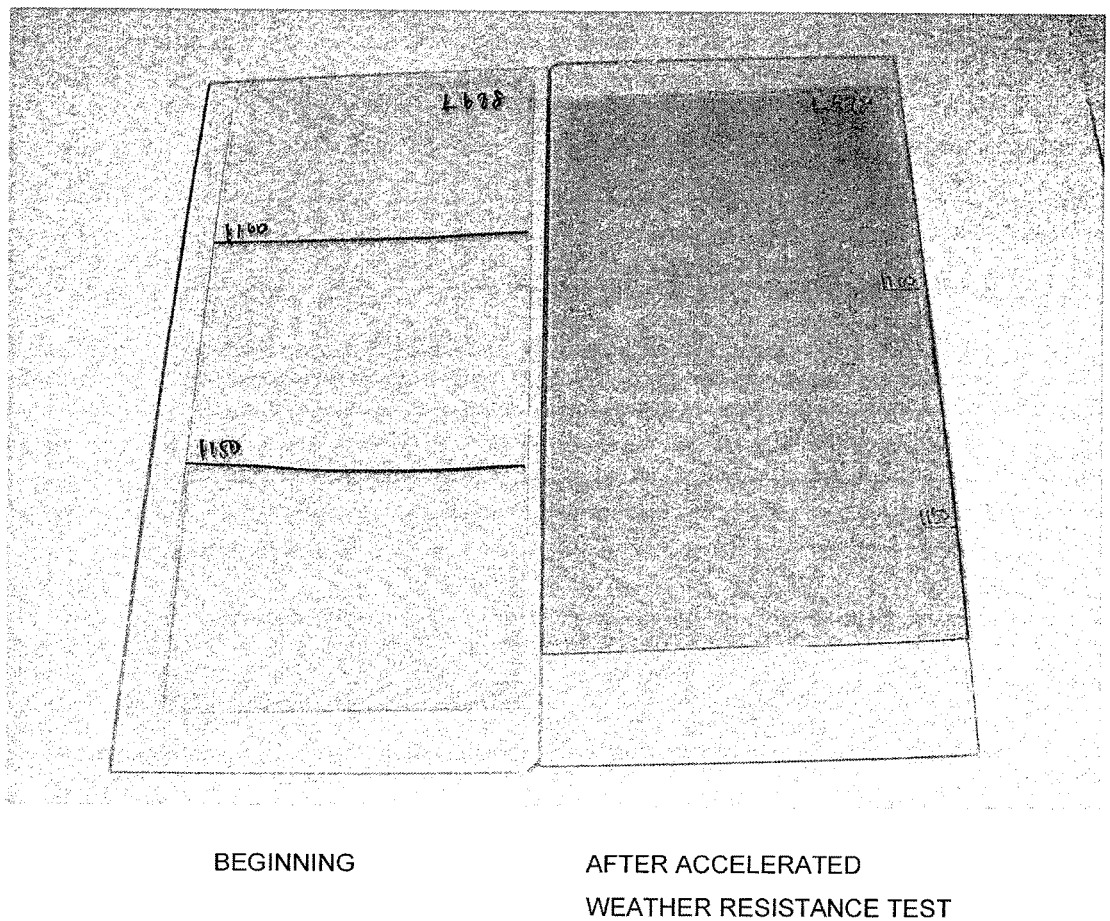
FIG. 16 is a photograph provided in order to make comparison between the initial weather resistance and the weather resistance after an accelerated weather resistance test for the light diffusion film of Example 4.

Furthermore, FIG. 16 shows a photograph in which the specimen in the beginning (left side) in Example 4, and the specimen after an accelerated weather resistance test (right side) are arranged for a comparison.

Example 5

In Example 5, a light diffusion film was produced in the same manner as in Example 1, except that when the composition for light diffusion film was prepared, the hindered amine-based photostabilizer as the component (D) was changed to TINUVIN 292 manufactured by BASF SE, which is a mixture of compounds represented by the following Formulas (7) and (8), and also, the amount of addition of the component (D) was changed to 0.25 parts by weight (0.1 parts by weight relative to the total amount (100 parts by weight) of the component (A) and the component (B)), and the film was evaluated. The results thus obtained are presented in Table 1.

Figure 17A:
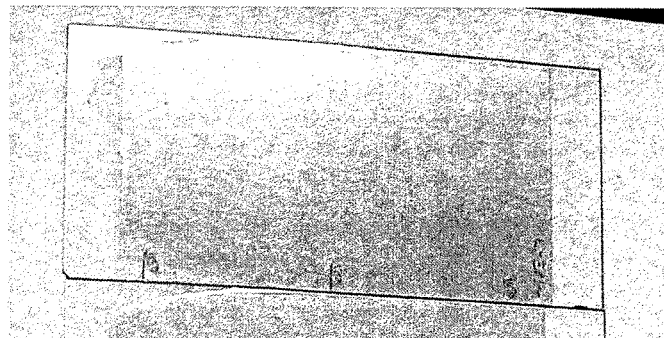
FIGS. 17(a) to 17(f) are photographs provided in order to show weather resistance of the light diffusion films of Examples 5 to 9 and Comparative Example 1.
Figure 17B:
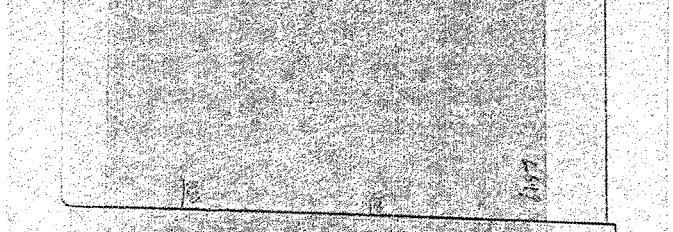

Furthermore, a photograph of the specimen after an accelerated weather resistance test is presented in FIG. 17(b).

Figure 17C:
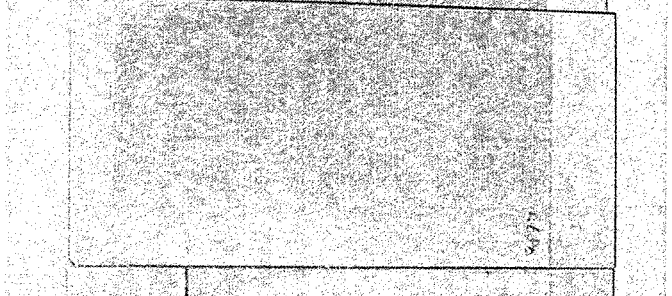
Figure 17D:
Figure 17E:
Figure 17F:
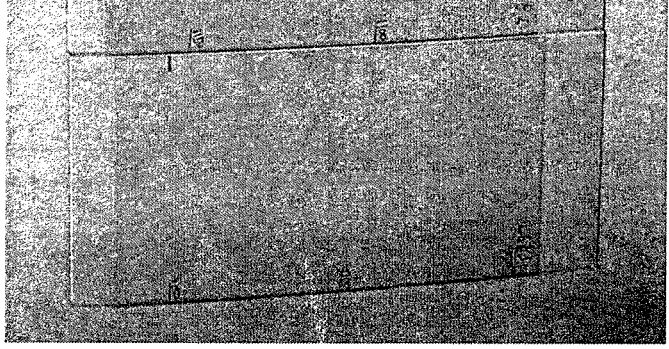

Meanwhile, FIG. 17(a) shows a photograph of the specimen after an accelerated weather resistance test in below-described Comparative Example 1 (amount of addition of the component (D): 0 parts by weight); FIG. 17(c) shows a photograph of the specimen after an accelerated test in below-described Example 6 (amount of addition of the component (D) relative to the total amount (100 parts by weight) of the component (A) and the component (B): 0.3 parts by weight; FIG. 17(d) shows a photograph of the specimen after an accelerated weather resistance test in below-described Example 7 (amount of addition of the component (D) relative to the total amount (100 parts by weight) of the component (A) and the component (B): 1 part by weight); FIG. 17(e) shows a photograph of the specimen after an accelerated weather resistance test in below-described Example 8 (amount of addition of the component (D) relative to the total amount (100 parts by weight) of the component (A) and the component (B): 2 parts by weight); and FIG. 17(f) shows a photograph of the specimen after an accelerated weather resistance test in below-described Example 9 (amount of addition of the component (D) relative to the total amount (100 parts by weight) of the component (A) and the component (B): 5 parts by weight).

From such FIGS. 17(a) to 17(f), it is understood that even if the kind of the component (D) is changed, as the amount of addition of the component (D) relative to the total amount (100 parts by weight) of the component (A) and the component (B) increases from 0 part by weight to 5 parts by weight, the degree of yellowing decreases, and weather resistance is enhanced.

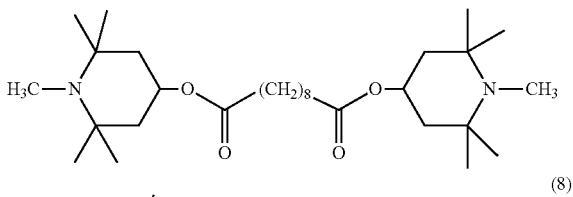

(7)

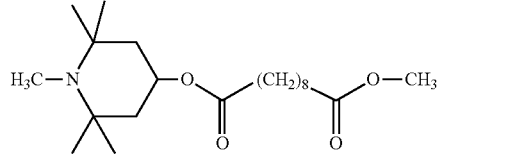

(8)

Example 6

In Example 6, a light diffusion film was produced in the same manner as in Example 1, except that when the composition for light diffusion film was prepared, the hindered amine-based photostabilizer as the component (D) was changed to TINUVIN 292 manufactured by BASF SE, and the amount of addition thereof was changed to 0.75 parts by weight (0.3 parts by weight relative to the total amount (100 parts by weight) of the component (A) and the component (B)), and the light diffusion film was evaluated. The results thus obtained are presented in Table 1 and FIG. 17(c).

Meanwhile, FIG. 17(c) shows a photograph of the specimen after an accelerated weather resistance test for the light diffusion film of Example 6.

Example 7

In Example 7, a light diffusion film was produced in the same manner as in Example 1, except that when the composition for light diffusion film was prepared, the hindered amine-based photostabilizer as the component (D) was changed to TINUVIN 292 manufactured by BASF SE, and the amount of addition thereof was changed to 2.5 parts by weight (1 part by weight relative to the total amount (100 parts by weight) of the component (A) and the component (B)), and the light diffusion film was evaluated. The results thus obtained are presented in Table 1 and FIG. 17(d).

Meanwhile, FIG. 17(d) shows a photograph of the specimen after an accelerated weather resistance test for the light diffusion film of Example 7.

Example 8

In Example 8, a light diffusion film was produced in the same manner as in Example 1, except that when the composition for light diffusion film was prepared, the hindered amine-based photostabilizer as the component (D) was changed to TINUVIN 292 manufactured by BASF SE, and the amount of addition thereof was changed to 5 parts by weight (2 parts by weight relative to the total amount (100 parts by weight) of the component (A) and the component (B)), and the light diffusion film was evaluated. The results thus obtained are presented in Table 1 and FIG. 17(*e*).

Meanwhile, FIG. 17(*e*) shows a photograph of the specimen after an accelerated weather resistance test for the light diffusion film of Example 8.

Example 9

In Example 9, a light diffusion film was produced in the same manner as in Example 1, except that when the composition for light diffusion film was prepared, the hindered amine-based photostabilizer as the component (D) was changed to TINUVIN 292 manufactured by BASF SE, and the amount of addition thereof was changed to 12.5 parts by weight (5 parts by weight relative to the total amount (100 parts by weight) of the component (A) and the component (B)), and the light diffusion film was evaluated. The results thus obtained are presented in Table 1 and FIG. 17(*f*).

Meanwhile, FIG. 17(*f*) shows a photograph of the specimen after an accelerated weather resistance test for the light diffusion film of Example 9.

Figure 18:
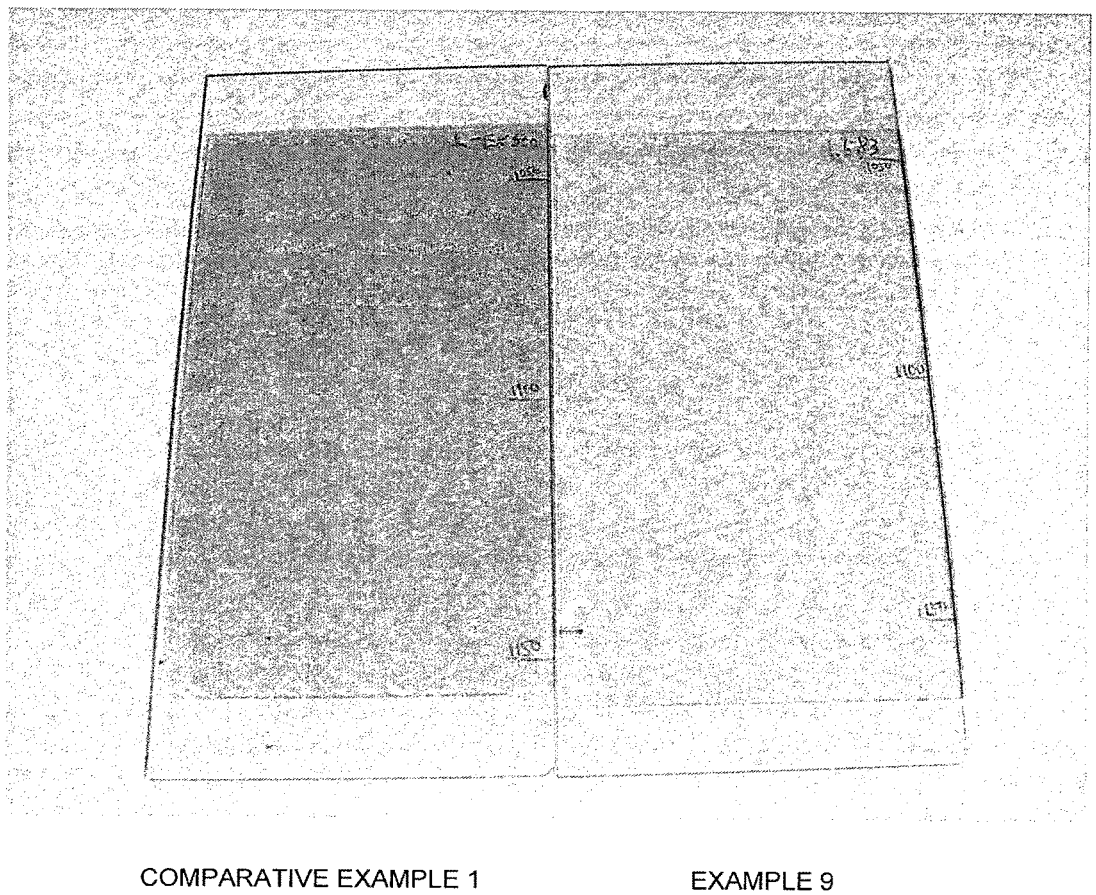
FIG. 18 is a photograph provided in order to make a comparison of weather resistance of the light diffusion films of Example 9 and Comparative Example 1.

Furthermore, FIG. 18 presents a photograph in which the specimen after an accelerated weather resistance test (left side) in Comparative Example 1 (amount of addition of the component (D): 0 parts by weight) that will be described below, and the specimen after an accelerated weather resistance test (right side) in Example 9 (amount of addition of the component (D) relative to the total amount (100 parts by weight) of the component (A) and the component (B): 5 parts by weight) are arranged for a comparison.

Figure 19:
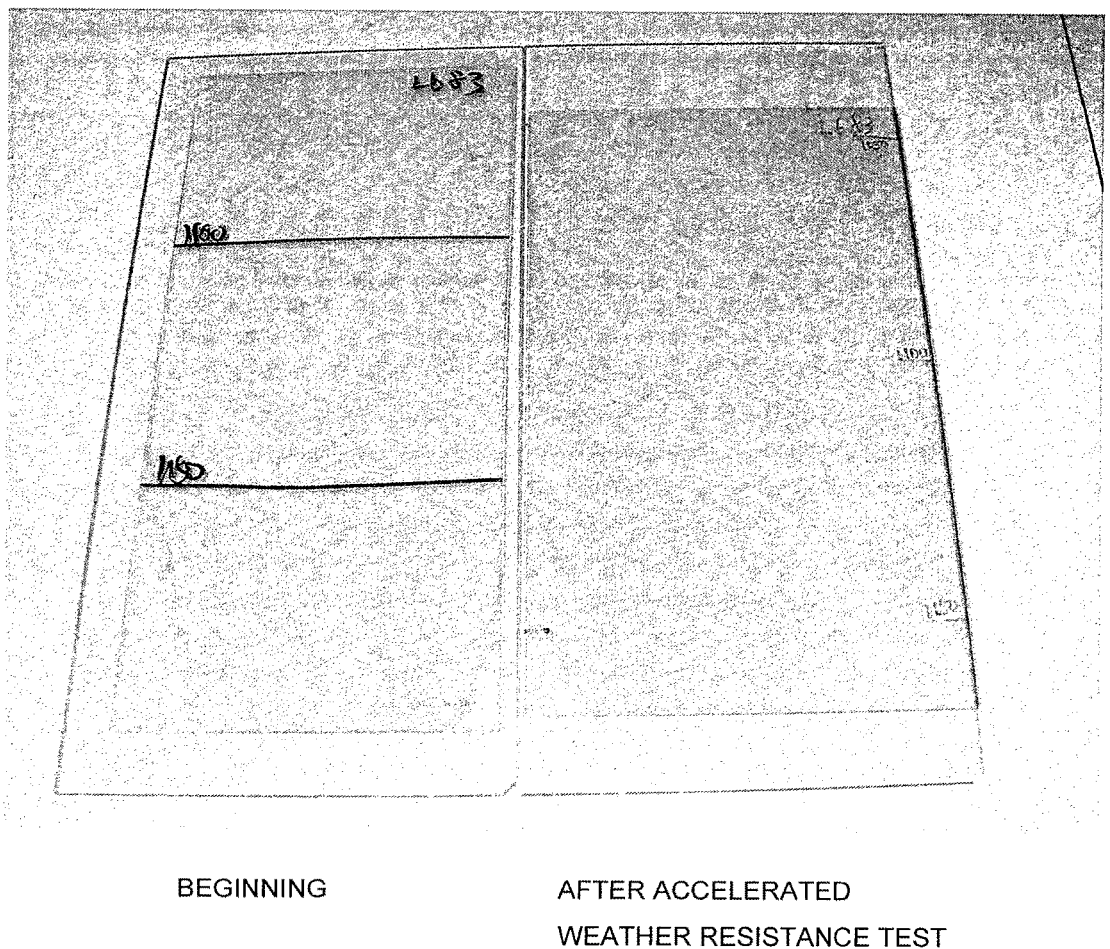
FIG. 19 is a photograph provided in order to make a comparison between the initial weather resistance and the weather resistance after an accelerated weather resistance test for the light diffusion film of Example 9.

Furthermore, FIG. 19 shows a photograph in which the specimen in the beginning (left side) in Example 9, and the specimen after an accelerated weather resistance test (right side) are arranged for a comparison.

From such FIG. 18, it is understood that in the light diffusion film of Example 9, yellowing is suppressed compared with the light diffusion film of Comparative Example 1.

Meanwhile, such yellowing not only has a problem in the external appearance, but also has a problem that when the light diffusion film is applied to a display and used for long in an environment exposed to ultraviolet radiation such as sunlight, the screen gradually acquires yellow tinge, and the original color of the image may not be reproduced.

Furthermore, in Example 9, the light diffusion characteristics of the light diffusion film thus obtained were also evaluated.

That is, as illustrated in FIG. 11, light was caused to enter in a direction perpendicular to the film plane of the light diffusion film through the glass side of the specimen in the beginning and after an accelerated weather resistance test, and a photograph of the diffusion state of diffused light at that time was taken in the Z-direction in FIG. 11, using a conoscope (manufactured by Autronic-Melchers GmbH). The results thus obtained are presented in FIGS. 20(*a*) and 20(*b*), respectively.

Meanwhile, the diagram illustrated in FIG. 11 is a schematic diagram of a cross-section obtained by cutting the light diffusion film thus obtained, at a plane that is parallel to the moving direction of the coating layer and is perpendicular to the film plane.

Figure 20A:
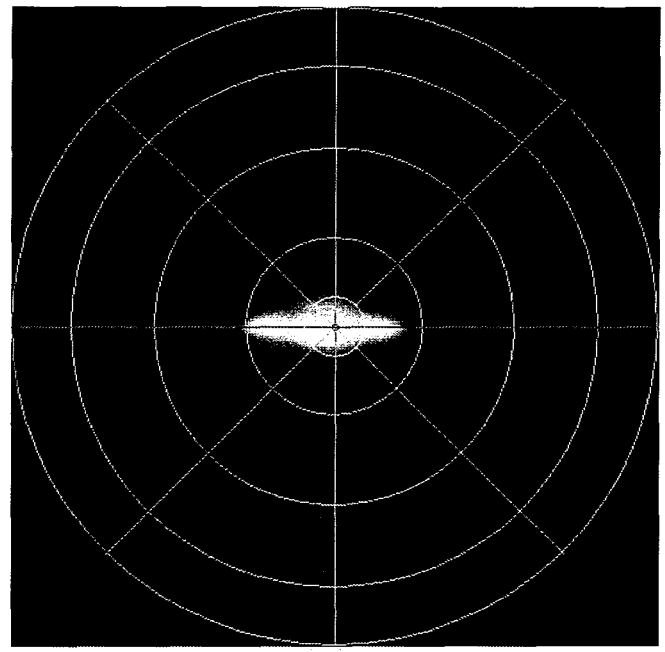
FIGS. 20(a) and 20(b) are photographs provided in order to make a comparison between the initial light diffusion characteristics and the light diffusion characteristics after an accelerated weather resistance test for the light diffusion film of Example 9.
Figure 20B:
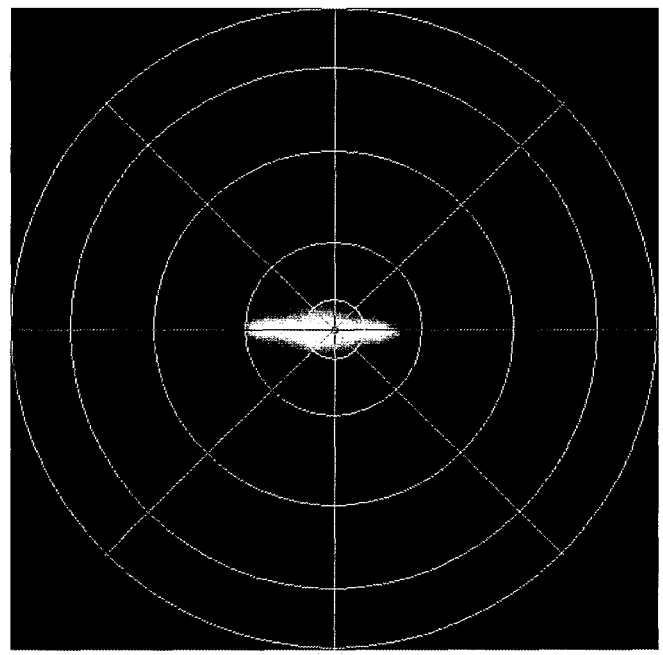

From such FIGS. 20(*a*) and 20(*b*), it is understood that since satisfactory anisotropic light diffusion characteristics are confirmed both before and after the accelerated weather resistance test, a well-defined louver structure is formed in the film, and the light diffusion film also has satisfactory incident angle dependency.

Furthermore, similarly, light was caused to enter in a direction perpendicular to the film plane of the light diffusion film through the glass side of the specimens after an accelerated weather resistance test in Comparative Example 1 (amount of addition of the component (D): 0 parts by weight) and Example 9 (amount of addition of the component (D) relative to the total amount (100 parts by weight) of the component (A) and the component (B): 5 parts by weight), and photographs of the diffusion state of diffused light at that time were taken in the Z-direction in FIG. 11. The results thus obtained are presented in FIGS. 21(*a*) and 21(*b*), respectively.

Figure 21A:
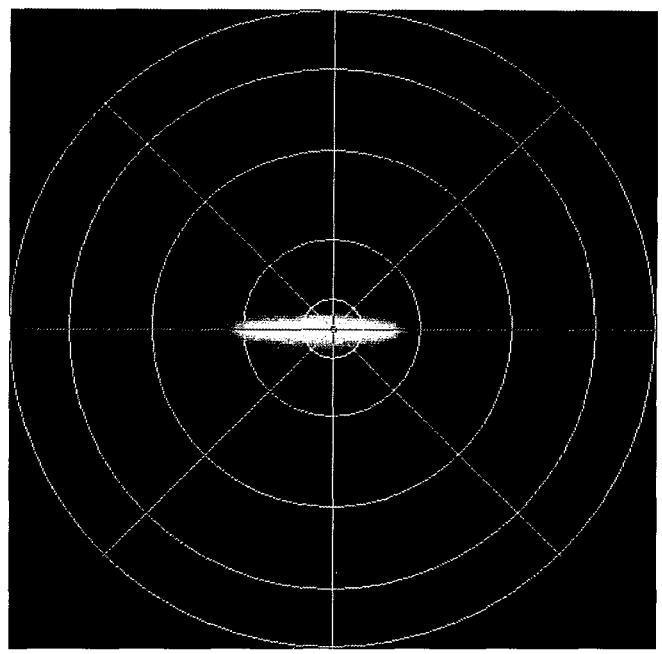
FIGS. 21(a) and 21(b) are diagrams provided in order to make a comparison of the light diffusion characteristics of the light diffusion films of Example 9 and Comparative Example 1.
Figure 21B:
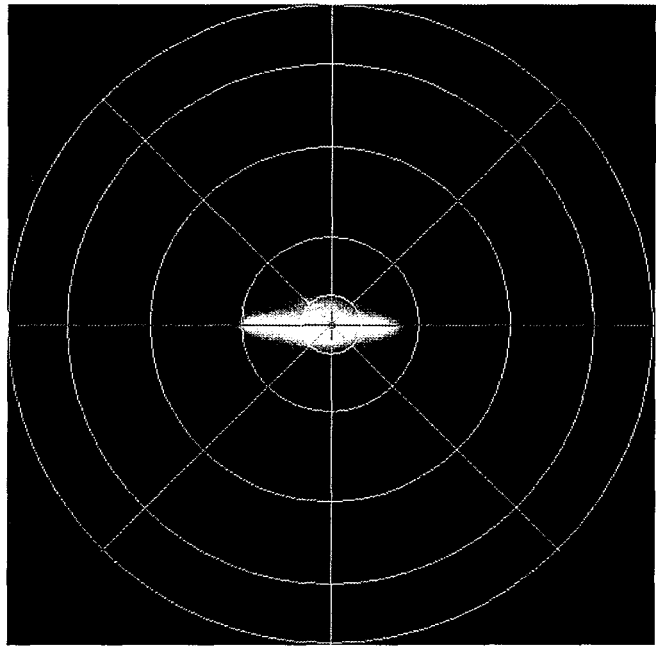

From such FIGS. 21(*a*) and 21(*b*), it is understood that no significant changes can be seen in the light diffusion characteristics, depending on the presence or absence of the addition of the component (D).

Therefore, it is understood that yellowing can be suppressed by adding the component (D), without decreasing satisfactory incident angle dependency.

Comparative Example 1

In Comparative Example 1, a light diffusion film was produced in the same manner as in Example 1, except that when the composition for light diffusion film was prepared, a hindered amine-based photostabilizer as the component (D) was not added, and the light diffusion film was evaluated. The results thus obtained are presented in Table 1 and FIG. 12(*a*) (=FIG. 17(*a*)).

Meanwhile, FIG. 12(*a*) (=FIG. 17(*a*)) is a photograph of the specimen after an accelerated weather resistance test in the light diffusion film of Comparative Example 1.

Figure 22:
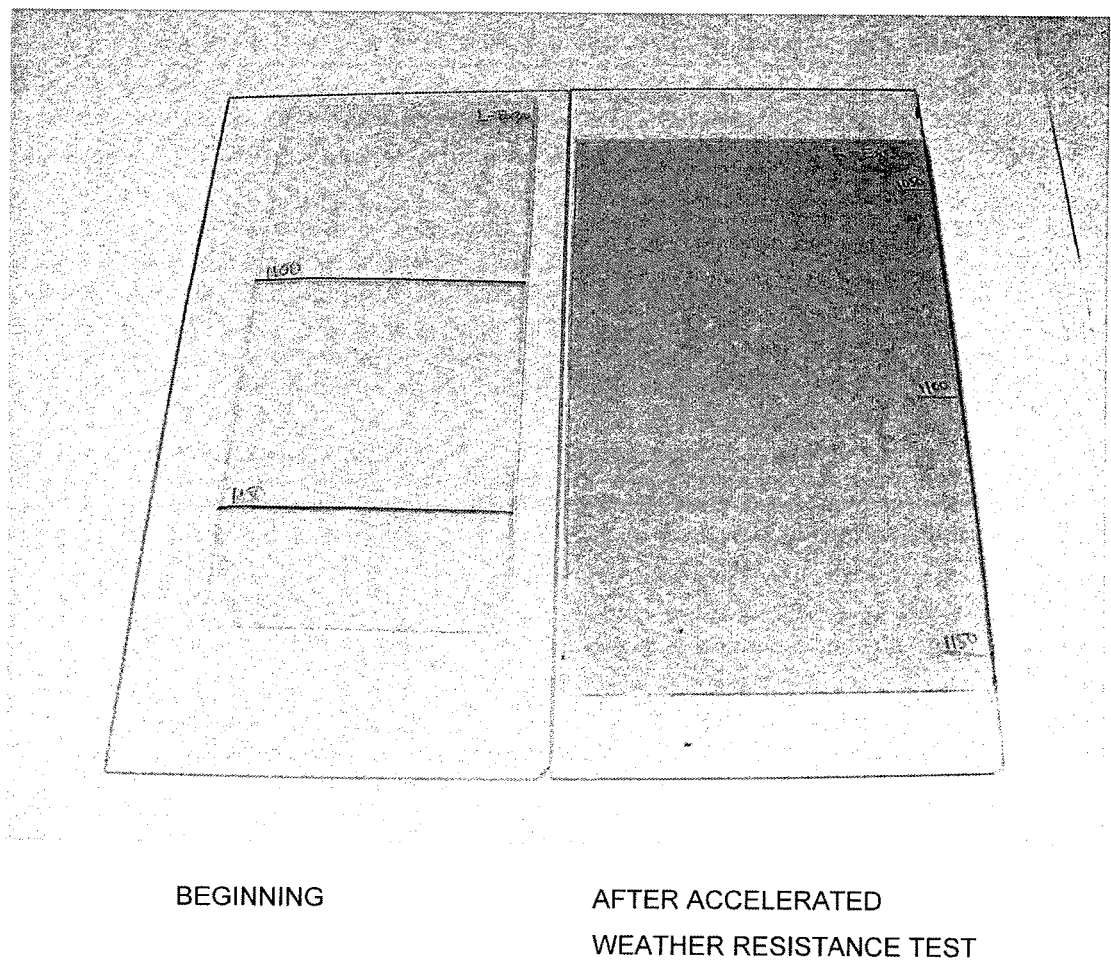
FIG. 22 is a photograph provided in order to make a comparison between the initial weather resistance and the weather resistance after an accelerated weather resistance test for the light diffusion film of Comparative Example 1.

Furthermore, FIG. 22 shows a photograph in which the specimen in the beginning (left side) in Comparative Example 1, and the specimen after an accelerated weather resistance test (right side) are arranged for a comparison.

Comparative Example 2

In Comparative Example 2, a light diffusion film was produced in the same manner as in Example 1, except that when the composition for light diffusion film was prepared, 0.5 parts by weight (0.2 parts by weight of the total amount (100 parts by weight) of the component (A) and the component (B)) of TINUVIN 477 manufactured by BASF SE, which is an ultraviolet absorber, was added as the component (D), instead of the hindered amine-based photostabilizer.

Figure 23:
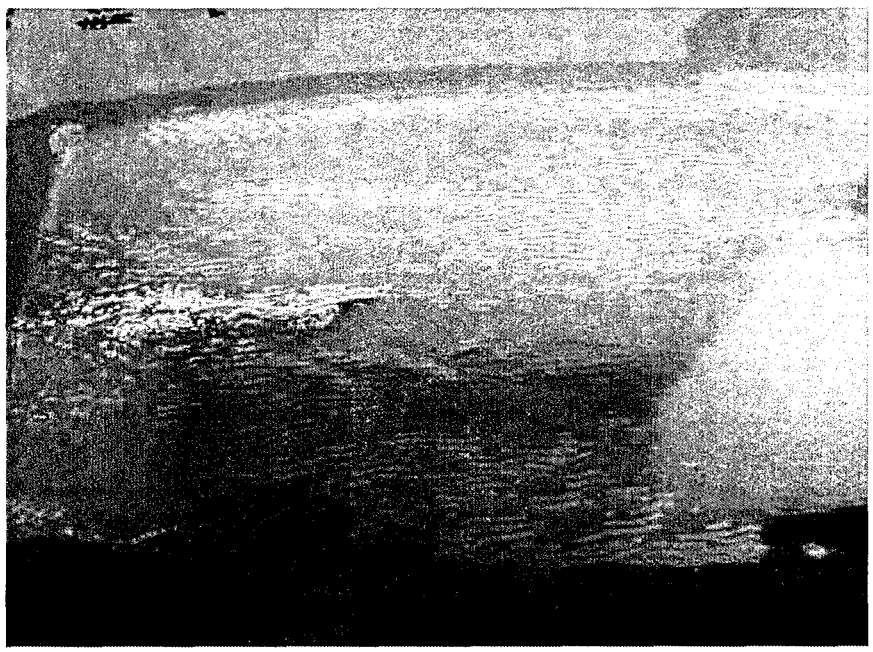
FIG. 23 is a photograph obtained by observing the surface of the light diffusion film of Comparative Example 2.

As a result, as illustrated in FIG. 23, defects occurred in the curing caused by ultraviolet irradiation, and contraction creases were generated on the film surface.

Therefore, since the film of Comparative Example 2 did not have the quality demanded as a light diffusion film, evaluations such as a weather resistance test were not carried out.

Comparative Example 3

In Comparative Example 3, a light diffusion film was produced in the same manner as in Example 1, except that when the composition for light diffusion film was prepared, 1.5 parts by weight (0.6 parts by weight relative to the total amount (100 parts by weight) of the component (A) and the component (B)) of TINUVIN 477 manufactured by BASF SE, which is an ultraviolet absorber, was added as the component (D), instead of the hindered amine-based photostabilizer.

As a result, curing caused by ultraviolet irradiation did not proceed, and a film could not be formed.

Therefore, in Comparative Example 3, since a light diffusion film could not be obtained, evaluations such as a weather resistance test were not carried out.

TABLE 1

| Composition for light diffusion film | | Evaluation Light resistance | | | | | | | | |
|---|---|---|---|---|---|---|---|---|---|---|
| HALS | | Y (−) | | | x (−) | | | y (−) | | |
| Kind | Amount of addition (parts by weight) | Beginning | After weather resistance test | Difference | Beginning | After weather resistance test | Difference | Beginning | After weather resistance test | Difference |
| TINUVIN 123 | 0.75 (0.3) | 87.02 | 82.12 | −4.9 | 0.3104 | 0.328 | 0.0176 | 0.3176 | 0.3413 | 0.0237 |
| | 2.5 (1) | 87.06 | 82.17 | −4.89 | 0.3104 | 0.3278 | 0.0174 | 0.3176 | 0.3408 | 0.0232 |
| | 5 (2) | 87.03 | 83.34 | −3.69 | 0.3104 | 0.3253 | 0.0149 | 0.3175 | 0.3381 | 0.0206 |
| | 12.5 (5) | 86.96 | 83.45 | −3.53 | 0.3103 | 0.3257 | 0.0154 | 0.3175 | 0.3382 | 0.0206 |
| TINUVIN 292 | 0.25 (0.1) | 86.81 | 83.57 | −3.24 | 0.3105 | 0.3235 | 0.013 | 0.3178 | 0.3358 | 0.018 |
| | 0.75 (0.3) | 86.85 | 83.47 | −3.38 | 0.3106 | 0.3235 | 0.0129 | 0.3178 | 0.3356 | 0.0178 |
| | 2.5 (1) | 86.76 | 85.01 | −1.75 | 0.311 | 0.3191 | 0.0081 | 0.3183 | 0.33 | 0.0117 |
| | 5 (2) | 86.61 | 85.14 | −1.47 | 0.3113 | 0.3185 | 0.0072 | 0.3185 | 0.329 | 0.0105 |
| | 12.5 (5) | 86.81 | 85.66 | −1.15 | 0.3117 | 0.3156 | 0.0039 | 0.3191 | 0.325 | 0.0059 |
| — | 0 (0) | 86.89 | 81.1 | −5.79 | 0.3104 | 0.3322 | 0.0218 | 0.3176 | 0.3465 | 0.0289 |
| TINUVIN 477 (non-HALS) | 0.5 (0.2) | — | — | — | — | — | — | — | — | — |
| | 1.5 (0.6) | — | — | — | — | — | — | — | — | — |

| Composition for light diffusion film | | Evaluation Light resistance | | | | | |
|---|---|---|---|---|---|---|---|
| HALS | | L* (−) | | | a* (−) | | |
| Kind | Amount of addition (parts by weight) | Beginning | After weather resistance test | Difference | Beginning | After weather resistance test | Difference |
| TINUVIN 123 | 0.75 (0.3) | 94.75 | 92.63 | −2.12 | −0.54 | −3.13 | −2.59 |
| | 2.5 (1) | 94.76 | 92.65 | −2.11 | −0.54 | −3.02 | −2.48 |
| | 5 (2) | 94.75 | 93.16 | −1.59 | −0.54 | −3 | −2.46 |
| | 12.5 (5) | 94.72 | 93.2 | −1.52 | −0.55 | −2.86 | −2.31 |
| TINUVIN 292 | 0.25 (0.1) | 94.66 | 93.26 | −1.4 | −0.58 | −2.77 | −2.19 |
| | 0.75 (0.3) | 94.68 | 93.22 | −1.46 | −0.56 | −2.71 | −2.15 |
| | 2.5 (1) | 94.64 | 93.89 | −0.75 | −0.62 | −2.24 | −1.62 |
| | 5 (2) | 94.57 | 93.94 | −0.63 | −0.56 | −2.08 | −1.52 |
| | 12.5 (5) | 94.66 | 94.17 | −0.49 | −0.68 | −1.59 | −0.91 |
| — | 0 (0) | 94.69 | 92.18 | −2.51 | −0.54 | −3.51 | −2.97 |
| TINUVIN 477 (non-HALS) | 0.5 (0.2) | — | — | — | — | — | — |
| | 1.5 (0.6) | — | — | — | — | — | — |

TABLE 1-continued

| | Composition for light diffusion film | | Evaluation Light resistance | | | |
| --- | --- | --- | --- | --- | --- | --- |
| | HALS | | b* (−) | | | |
| | Kind | Amount of addition (parts by weight) | Beginning | After weather resistance test | Difference | Decision |
| | TINUVIN 123 | 0.75 (0.3) | 0.58 | 12.01 | 11.43 | F |
| | | 2.5 (1) | 0.57 | 11.83 | 11.26 | F |
| | | 5 (2) | 0.56 | 10.48 | 9.92 | F |
| | | 12.5 (5) | 0.56 | 10.6 | 10.04 | F |
| | TINUVIN 292 | 0.25 (0.1) | 0.68 | 9.36 | 8.68 | G |
| | | 0.75 (0.3) | 0.71 | 9.29 | 8.58 | G |
| | | 2.5 (1) | 0.95 | 6.59 | 5.64 | G |
| | | 5 (2) | 1.08 | 6.12 | 5.04 | G |
| | | 12.5 (5) | 1.38 | 4.18 | 2.8 | VG |
| | — | 0 (0) | 0.58 | 14.49 | 13.91 | B |
| | TINUVIN 477 (non-HALS) | 0.5 (0.2) | — | — | — | — |
| | | 1.5 (0.6) | — | — | — | — |

The values in the parentheses indicate the amount of addition (parts by weight) of the component (D) relative to the total amount (100 parts by weight) of the component (A) and the component (B).

INDUSTRIAL APPLICABILITY

As discussed above, according to the present invention, when a (meth)acrylic acid ester having a particular structure, a urethane (meth)acrylate, a photopolymerization initiator, and a hindered amine-based photostabilizer are mixed at predetermined proportions, and then the mixture is photo-cured, a light diffusion film having satisfactory incident angle dependency and also have excellent weather resistance can be obtained.

Therefore, the composition for anisotropic light diffusion film of the present invention can be applied to light controlling films for reflective type liquid crystal display devices as well as viewing angle control films, viewing angle expansion films, and projection screens, and the composition for anisotropic light diffusion film of the present invention is expected to contribute significantly to quality enhancement.

EXPLANATIONS OF LETTERS OR NUMERALS

1: Coating layer
2: Process sheet
10: Anisotropic light diffusion film
12: Plate-shaped region having relatively high refractive index
13: Louver structure
13': Boundary surface of louver structure
14: Plate-shaped region having relatively low refractive index
20: Isotropic light diffusion film
22: Pillar-shaped object having relatively high refractive index
23: Columnar structure
23': Boundary surface of columnar structure
24: Region having relatively low refractive index
50: Light irradiated from light source
60: Parallel light
120: Ultraviolet irradiating apparatus
122: Cold mirror
123: Light blocking plate
125: Linear light source
200: Irradiated light parallelizing member
202: Point light source
204: Lens
210: Light blocking member
210a: Plate-shaped member
210b: Cylindrical member

The invention claimed is:

1. A composition for light diffusion film, comprising a (meth)acrylic acid ester containing plural aromatic rings as component (A); a urethane (meth)acrylate as component (B); a photopolymerization initiator as component (C); and a hindered amine-based photostabilizer as component (D),
wherein component (A) is present in an amount of 25 parts to 400 parts by weight relative to 100 parts by weight of the component (B),
component (C) is present in an amount of 0.2 parts to 20 parts by weight relative to the total amount, taken as 100 parts by weight, of the component (A) and the component (B), and
component (D) is present in an amount of 0.1 parts to 10 parts by weight relative to the total amount, taken as 100 parts by weight, of the component (A) and the component (B).

2. The composition for light diffusion film according to claim 1, wherein the component (D) is a hindered amine-based photostabilizer represented by the following Formula (1):

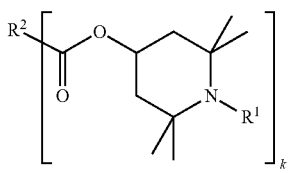

(1)

wherein in Formula (1), $R^1$ represents a hydrogen atom, an alkyl group having 1 to 10 carbon atoms, or an alkoxy group having 1 to 10 carbon atoms; $R^2$ represents a hydrogen atom, a k-valent aliphatic hydrocarbon group having 1 to 10 carbon atoms, a k-valent alicyclic hydrocarbon group having 3 to 20 carbon atoms, a k-valent aromatic hydrocarbon group having 6 to 20 carbon atoms, a k-valent aryl group having 7 to 30 carbon atoms, a k-valent heterocyclic aromatic hydrocarbon group having 3 to 20 carbon atoms, or a monovalent fatty acid in which the number of carbon atoms of the carbon chain moiety having an ester moiety formed with an alcohol having 1 to 10 carbon atoms at the end on the opposite side of the piperidine skeleton is 1 to 20; and k represents an integer from 1 to 3.

3. The composition for light diffusion film according to claim 1, wherein the component (C) is an α-hydroxyacetophenone type photopolymerization initiator.

4. The composition for light diffusion film according to claim 1, wherein the component (A) is a biphenyl compound represented by the following Formula (2):

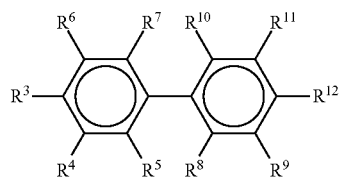

(2)

wherein in Formula (2), $R^3$ to $R^{12}$ are respectively independent of one another; at least one of $R^3$ to $R^{12}$ represents a substituent represented by the following Formula (3); and the others each represent any one substituent selected from a hydrogen atom, a hydroxyl group, a carboxyl group, an alkyl group, an alkoxy group, a halogenated alkyl group, a hydroxyalkyl group, a carboxyalkyl group, and a halogen atom;

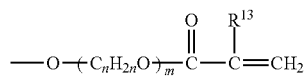

(3)

wherein in Formula (3), $R^{13}$ represents a hydrogen atom or a methyl group; n represents an integer from 1 to 4; and m represents an integer from 1 to 10.

5. The composition for light diffusion film according to claim 4, wherein in Formula (2), any one of $R^4$ to $R^{11}$ represents the substituent represented by Formula (3).

6. The composition for light diffusion film according to claim 1, wherein the component (B) is a urethane (meth) acrylate which has a weight average molecular weight of 3,000 to 20,000, has constituent components derived from the following components (B1) to (B3),
(B1) a compound containing two isocyanate groups via an aliphatic ring;
(B2) a polyalkylene glycol; and
(B3) a hydroxyalkyl (meth) acrylate,
and is composed at a molar ratio of component (B1): component (B2):component (B3)=1 to 5:1:1 to 5.

7. A light diffusion film formed by irradiating a composition for light diffusion film with active energy radiation, the composition for light diffusion film comprising a (meth)acrylic acid ester containing plural aromatic rings as component (A); a urethane (meth)acrylate as component (B); a photopolymerization initiator as component (C); and a hindered amine-based photostabilizer as component (D),
wherein component (A) is present in an amount of 25 parts to 400 parts by weight relative to 100 parts by weight of the component (B), component (C) is present in an amount of 0.2 parts to 20 parts by weight relative to the total amount, taken as 100 parts by weight, of the component (A) and the component (B), and the component (D) is present in an amount of 0.1 parts to 10 parts by weight relative to the total amount taken as 100 parts by weight, of the component (A) and the component (B).

8. The light diffusion film according to claim 7, wherein the film thickness is from 60 to 700 μm.

9. The light diffusion film according to claim 7, wherein the film thickness is 170 μm or more, and the Δb* value, which is the difference between the values of b* obtained before and after an accelerated weather resistance test of radiating light having a center wavelength of 388 nm under the conditions of 100 hours at an illuminance of 50 mW/cm² using a fadeometer equipped with a carbon arc lamp, is 12 or less.

* * * * *